(12) United States Patent
Yoo et al.

(10) Patent No.: US 12,399,578 B2
(45) Date of Patent: Aug. 26, 2025

(54) TOUCH INPUT DEVICE AND DISPLAY DEVICE USING THE SAME

(71) Applicant: SAMSUNG DISPLAY CO., LTD., Yongin-si (KR)

(72) Inventors: Gi Na Yoo, Cheonan-si (KR); Ju Yeon Kim, Asan-si (KR); Won Sang Park, Yongin-si (KR); Chang Woo Shim, Cheonan-si (KR); Seong Jun Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 234 days.

(21) Appl. No.: 17/823,560

(22) Filed: Aug. 31, 2022

(65) Prior Publication Data

US 2023/0221810 A1 Jul. 13, 2023

(30) Foreign Application Priority Data

Jan. 13, 2022 (KR) ........................ 10-2022-0005025

(51) Int. Cl.
*G06F 3/0354* (2013.01)
*G06F 3/038* (2013.01)
*G06F 3/042* (2006.01)

(52) U.S. Cl.
CPC ........ *G06F 3/03542* (2013.01); *G06F 3/0386* (2013.01); *G06F 3/0421* (2013.01); *G06F 2203/04101* (2013.01)

(58) Field of Classification Search
CPC .. G06F 3/03542; G06F 3/0386; G06F 3/0421; G06F 2203/04101
See application file for complete search history.

(56) References Cited

U.S. PATENT DOCUMENTS

| | | | | |
|---|---|---|---|---|
| 2009/0238572 A1* | 9/2009 | Yamaki | .............. | H04B 10/1149 398/106 |
| 2011/0157044 A1* | 6/2011 | Yu | ......................... | G06F 3/0428 345/173 |
| 2012/0091902 A1* | 4/2012 | Radermacher | .......... | F28D 17/02 315/159 |
| 2013/0181896 A1* | 7/2013 | Gruhlke | .................. | G06F 3/017 345/156 |
| 2013/0328948 A1* | 12/2013 | Kunkel | .................... | G09G 3/20 345/87 |
| 2016/0077784 A1 | 3/2016 | Yamada | | |
| 2016/0284316 A1* | 9/2016 | Kestelli | .................... | G09G 5/02 |
| 2017/0277950 A1* | 9/2017 | Sung | .................. | H04N 1/00307 |
| 2022/0075461 A1* | 3/2022 | Yamazaki | ................. | G09F 9/30 |

FOREIGN PATENT DOCUMENTS

KR 10-2014-0079215 6/2014

* cited by examiner

*Primary Examiner* — Michelle Chin
(74) *Attorney, Agent, or Firm* — F. CHAU & ASSOCIATES, LLC

(57) ABSTRACT

A touch input device includes a communication module receiving external light characteristic information. A code detector emits infrared light and receives infrared light reflected from a display panel to detect code patterns of the display panel. A light emitting driver controls an infrared light emission operation of the code detector. A code processor modulates an emission control signal so that an infrared light emission characteristic of the code detector is changed according to a change in the external light characteristic information and controls driving of the light emitting driver.

21 Claims, 19 Drawing Sheets

TOUCH INPUT DEVICE AND DISPLAY DEVICE USING THE SAME

CROSS-REFERENCE TO RELATED APPLICATION

This application claims priority under 35 U.S.C. § 119 to Korean Patent Application No. 10-2022-0005025, filed on Jan. 13, 2022 in the Korean Intellectual Property Office, the contents of which are herein incorporated by reference herein in its entirety.

TECHNICAL FIELD

The present disclosure relates to a display device and, more specifically, to a touch input device and a display device using the same.

DISCUSSION OF THE RELATED ART

Display devices are increasingly being incorporated into a diverse set of products. For example, display devices have been applied to various electronic devices such as smartphones, digital cameras, laptop computers, navigation devices, and smart televisions. The display devices may be flat panel display devices such as liquid crystal display (LCD) devices, field emission display devices, or organic light emitting diode (OLED) display devices. Among such flat panel display devices, a light emitting display device may display an image without the use of a backlight providing light to a display panel because each pixel of the display panel includes light emitting elements that may emit light by themselves.

Recently developed display devices have incorporated the use of a touch sensor for detecting a touch input of a user's body (e.g., a finger) and/or an electronic pen/stylus. The display device may sense the touch input more precisely when such a stylus is used than when using only the touch of a portion of the user's body, particularly when the stylus is an active stylus that emits and/or senses a signal rather than a passive stylus that is only used to apply pressure and/or conduct capacitance.

SUMMARY

A touch input device includes a communication module receiving external light characteristic information. A code detector emits infrared light and receives infrared light reflected from a display panel to detect code patterns of the display panel. A light emitting driver controls an infrared light emission operation of the code detector. A code processor modulates an emission control signal so that an infrared light emission characteristic of the code detector is changed according to a change in the external light characteristic information and controls driving of the light emitting driver.

The code processor may detect an intensity of light, an amount of light, a color temperature, brightness, luminance, and/or a wavelength band from the external light characteristic information, and modulate an amplitude and a pulse width of the emission control signal so that an infrared light emission intensity or wavelength band characteristic of the code detector is changed according to a change in the intensity of light, the amount of light, the color temperature, the brightness, the luminance, and/or the wavelength band.

The code processor may modulate the emission control signal so that the infrared light emission intensity or wavelength band of the code detector is changed in inverse proportion to a change in the intensity, the amount of light, the color temperature, the brightness, the luminance, and/or the wavelength band among the external light characteristic information, and supply the modulated emission control signal to the light emitting driver.

The code processor may modulate an amplitude and a pulse width of the emission control signal so that the infrared light emission intensity or wavelength band of the code detector is changed in proportion to a change in the intensity, the amount of light, the color temperature, the brightness, the luminance, and/or the wavelength band among the external light characteristic information.

The code processor may calculate radiation sensitivity according to a color temperature characteristic among the external light characteristic information using a look-up table and may set the radiation sensitivity as a conversion coefficient, may set an infrared light emission intensity or amount of light target value of the code detector by substituting the intensity or the amount of light among the external light characteristic information and the set conversion coefficient into Equation 1: Infrared light emission intensity (or amount of light)∝1/(intensity (or amount of light) of external visible light×conversion coefficient), and may modulate the emission control signal according to the infrared light emission intensity or amount of light target value.

The communication module may selectively supply infrared light characteristic information to the code processor when the infrared light characteristic information is received from an external source.

The code processor may modulate an amplitude and a pulse width of the emission control signal so that the infrared light emission intensity or wavelength band characteristic of the code detector is changed in proportion to a change in intensity or a wavelength band of infrared light among the infrared light characteristic information, and may supply the emission control signal of which the amplitude and the pulse width are modulated to the light emitting driver.

The code processor may modulate an amplitude and a pulse width of the emission control signal so that the infrared light emission intensity or wavelength band characteristic of the code detector is changed in inverse proportion to a change in intensity or a wavelength band of infrared light among the infrared light characteristic information, and may supply the emission control signal of which the amplitude and the pulse width are modulated to the light emitting driver.

A display device includes a display panel in which code patterns are formed. An illuminance sensor detects external light characteristic information of the display panel. A main processor controls image display driving of the display panel. A touch input device receives infrared light reflected from the display panel to detect shape data for the code patterns, generates coordinate data according to the shape data, and transfers the generated coordinate data to the main processor.

The main processor may modulate digital video data so that luminance or brightness of an image displayed on the display panel is changed in proportion to a change in a detection value of an intensity of light, an amount of light, a color temperature, luminance, and/or brightness among the external light characteristic information input from the illuminance sensor.

The code patterns may be formed in shapes of at least one electrode of a plurality of driving electrodes, a plurality of sensing electrodes, and a plurality of dummy electrodes included in a touch sensor of the display panel, or the code patterns may be formed by light blockers on partial areas of front surfaces of at least one electrode of the plurality of driving electrodes, the plurality of sensing electrodes, and the plurality of dummy electrodes.

The display device may further include a proximity sensor emitting infrared light toward a front surface or at least one side surface of the display panel and detecting infrared light characteristic information on infrared light reflected from the front surface or the at least one side surface of the display panel.

The touch input device may include a communication module receiving the external light characteristic information, a code detector emitting infrared light and receiving the infrared light reflected from the display panel to detect the code patterns, a light emitting driver controlling an infrared light emission operation of the code detector, and a code processor modulating an emission control signal so that an infrared light emission characteristic of the code detector is changed according to a change in the external light characteristic information and controlling driving of the light emitting driver.

The code processor may detect an intensity of light, an amount of light, a color temperature, brightness, luminance, and a wavelength band from the external light characteristic information, and/or may modulate an amplitude and a pulse width of the emission control signal so that an infrared light emission intensity or wavelength band characteristic of the code detector is changed according to a change in the intensity of light, the amount of light, the color temperature, the brightness, the luminance, and/or the wavelength band.

The code processor may modulate the emission control signal so that the infrared light emission intensity or wavelength band of the code detector is changed in inverse proportion to a change in the intensity of light, the amount of light, the color temperature, the brightness, the luminance, and/or the wavelength band among the external light characteristic information, and may supply the modulated emission control signal to the light emitting driver.

The code processor may modulate an amplitude and a pulse width of the emission control signal so that the infrared light emission intensity or wavelength band of the code detector is changed in proportion to a change in the intensity of light, the amount of light, the color temperature, the brightness, the luminance, and/or the wavelength band among the external light characteristic information.

The code processor may calculate radiation sensitivity according to a color temperature characteristic among the external light characteristic information using a look-up table and may set the radiation sensitivity as a conversion coefficient, set an infrared light emission intensity or amount of light target value of the code detector by substituting the intensity or the amount of light among the external light characteristic information and the set conversion coefficient into Equation 1: Infrared light emission intensity (or amount of light) of light emitter$\propto 1/$(intensity (or amount of light) of external visible light$\times$conversion coefficient), and modulate the emission control signal according to the infrared light emission intensity or amount of light target value.

The communication module may selectively supply infrared light characteristic information to the code processor when the infrared light characteristic information is received.

The code processor may modulate an amplitude and a pulse width of the emission control signal so that the infrared light emission intensity or wavelength band characteristic of the code detector is changed in proportion to a change in intensity or a wavelength band of infrared light among the infrared light characteristic information, and supply the emission control signal of which the amplitude and the pulse width are modulated to the light emitting driver.

The code processor may modulate an amplitude and a pulse width of the emission control signal so that the infrared light emission intensity or wavelength band characteristic of the code detector is changed in inverse proportion to a change in intensity or a wavelength band of infrared light among the infrared light characteristic information, and may supply the emission control signal of which the amplitude and the pulse width are modulated to the light emitting driver.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The present invention will now be described more fully hereinafter with reference to the accompanying drawings, in which embodiments of the invention are shown. This invention may, however, be embodied in different forms and should not necessarily be construed as limited to the embodiments set forth herein. Rather, these embodiments are provided so that this disclosure will be thorough and complete, and will filly convey the scope of the invention to those skilled in the art.

It will also be understood that when a layer is referred to as being "on" another layer or substrate, it can be directly on the other layer or substrate, or intervening layers may also be present. The same reference numbers may indicate the same components throughout the specification and the drawings.

It will be understood that, although the terms "first," "second," etc. may be used herein to describe various elements, these elements should not necessarily be limited by these terms. These terms are only used to distinguish one element from another element. For instance, a first element discussed below could be termed a second element without departing from the teachings of the present invention. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, specific embodiments will be described with reference to the accompanying drawings.

Figure 1:
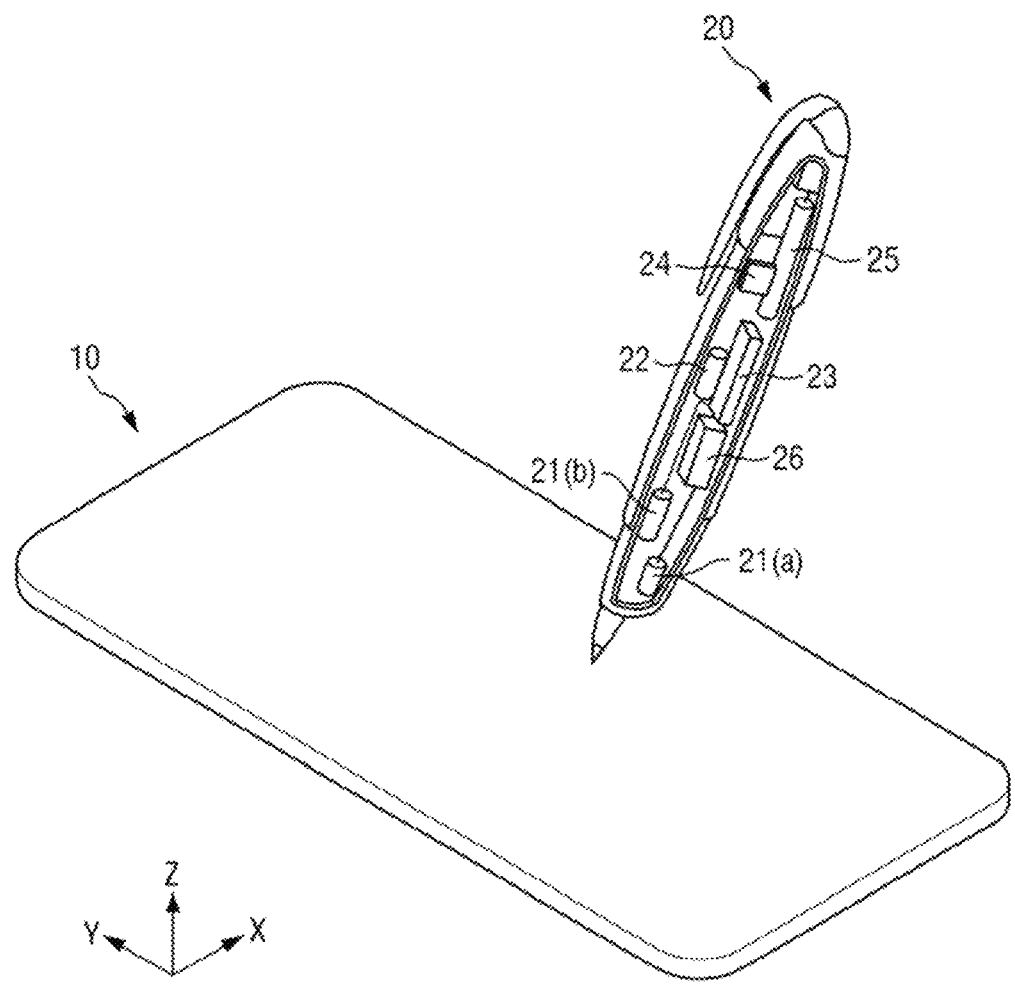
FIG. 1 is a perspective cut-away view illustrating configurations of a touch input device and a display device according to an embodiment of the present disclosure.

FIG. 1 is a perspective cut-away view illustrating configurations of a touch input device and a display device according to an embodiment of the present disclosure. In addition, FIG. 2 is a block diagram illustrating the touch input device and the display device of FIG. 1 according to an embodiment.

Figure 2:
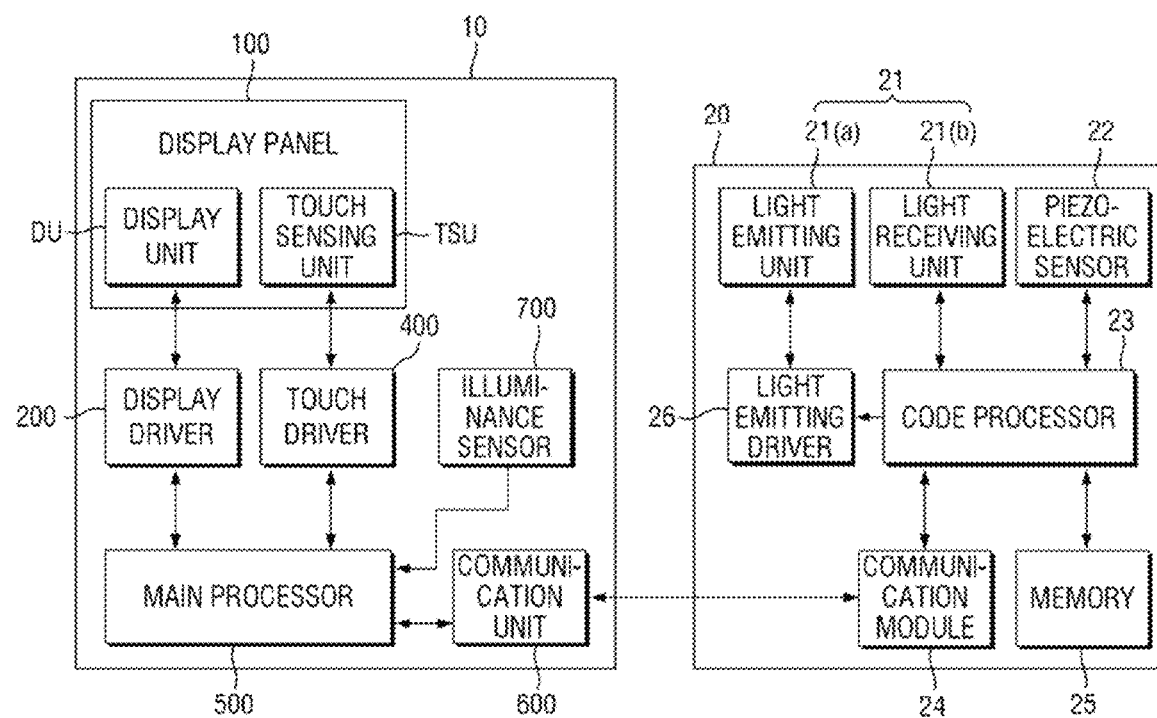
FIG. 2 is a block diagram illustrating the touch input device and the display device of FIG. 1 according to an embodiment.

Referring to FIGS. 1 and 2, a display device 10 may be applied to portable electronic devices such as mobile phones, smartphones, tablet personal computers (PCs), mobile communication terminals, electronic notebooks, electronic books, portable multimedia players (PMPs), navigation devices, and ultra mobile PCs (UMPCs). As an example, the display device 10 may be applied as a display of televisions, laptop computers, monitors, billboards, or an Internet of Things (IOTs) device. As an example, the display device 10 may be applied to wearable devices such as smart watches, watch phones, glasses-type displays, and head mounted displays (HMDs).

The display device 10 includes a display panel 100, a display driver 200, a touch driver 400, a main processor 500, an illuminance sensor 700, and a communicator 600. The communicator 600 may be a module for handling communications to and from connected devices (such as the touch input device) and may include, for example, an encoder, a decoder, connection pads, etc. In addition, the touch input device 20 includes a code detector 21, a piezoelectric sensor 22, a code processor 23, a communication module 24, a light emitting driver 26, and a memory 25.

The display device 10 uses the touch input device 20 as a touch input mechanism. The display panel 100 of the display device 10 may include a display DU displaying an image and a touch sensor TSU sensing a touch such as a touch of a human body part such as a finger, the touch input device 20, and the like.

The display DU of the display panel 100 may include a plurality of pixels and display the image using the plurality of pixels. The touch sensor TSU of the display panel 100 may be formed on a front surface portion of the display panel 100. The touch sensor TSU may include a plurality of touch electrodes to sense a user's touch in a capacitive manner. Here, code patterns may be formed on some of the plurality of touch electrodes, and may be sensed by the touch input device 20. Alternatively, some of the plurality of touch electrodes may be formed in various code pattern shapes, and the code pattern shapes may allow code patterns to be sensed by the touch input device 20.

When the code patterns are formed on some of the plurality of touch electrodes, the code patterns are formed of light blockers covering some of the plurality of touch electrodes at a predetermined area to form preset planar code shapes. Accordingly, the code patterns are sensed by the touch input device 20 according to the planar code shapes of the light blockers, sizes of planar codes, and the like. Dummy patterns for blocking light may be further formed on portions of a front surface of the plurality of touch electrodes on which the code patterns are not formed, so as not to overlap the code patterns.

When some of the touch electrodes of the plurality of touch electrodes are formed in the code pattern shapes, they may be bent or cut in upward, downward, leftward, rightward, and/or diagonal directions along vertical and horizontal reference lines of touch electrodes disposed at preset regular intervals to be formed in preset code shapes. Accordingly, the code patterns are sensed by the touch input device 20 according to bent or cut directions, cut sizes, cut shapes, and the like. Formation structures of the code patterns as well as the touch sensor TSU of the display panel 100 will be described later in more detail with reference to the accompanying drawings.

The display driver 200 may output signals and voltages for driving the display DU. The display driver 200 may supply data voltages to data lines. The display driver 200 may supply a source voltage to a power line and supply gate control signals to a gate driver.

The touch driver 400 may be connected to the touch sensor TSU. The touch driver 400 may supply touch driving signals to the plurality of touch electrodes of the touch sensor TSU and sense changes in capacitance between the plurality of touch electrodes. The touch driver 400 may determine whether or not a user's touch input has been performed and calculate touch coordinates, based on the change in capacitance between the plurality of touch electrodes.

The illuminance sensor 700 may be formed integrally with the display panel 100 in a front surface direction of the display panel 100 so as to detect light characteristic information in the front surface direction of the display panel 100. Alternatively, the illuminance sensor 700 may be disposed on at least one side surface of the display panel 100. The illuminance sensor 700 detects the light characteristic information in the front surface direction of the display panel 100 in response to a detection control signal from the main processor 500. The illuminance sensor 700 detects light characteristic information including an intensity of light, an amount of light, a color temperature, brightness, luminance, and/or a wavelength band in the front surface direction of the display panel 100. The illuminance sensor 700 may supply the light characteristic information detected according to the detection control signal to the main processor 500, the communicator 600, and the like.

The main processor 500 may control all functions of the display device 10. For example, the main processor 500 may supply digital video data to the display driver 200 so that the display panel 100 displays the image. As an example, the main processor 500 may receive touch data from the touch driver 400 to determine user's touch coordinates, and then generate digital video data according to the user's touch coordinates or execute an application indicated by an icon displayed on the user's touch coordinates. As an example, the main processor 500 may receive coordinate data from the touch input device 20 to determine touch coordinates of the touch input device 20, and then generate digital video data according to the touch coordinates or execute an application indicated by an icon displayed on the touch coordinates of the touch input device 20.

The main processor 500 transmits the detection control signal to the illuminance sensor 700 in units of a preset period to detect light characteristic information on external light applied to a front surface of the display panel 100. In addition, when the light characteristic information is received through the illuminance sensor 700, the main processor 500 changes luminance or brightness of the image displayed on the display panel 100 according to an intensity of light, an amount of light, a color temperature, brightness, luminance, and/or a wavelength band included in the light characteristic information. For example, the main processor 500 may modulate the digital video data so that the luminance or the brightness of the image displayed on the display panel 100 is changed in proportion to a change in an intensity of light, an amount of light, a color temperature, brightness, luminance, and/or a wavelength band of the external light applied to the display panel 100. As an example, when the characteristic value such as the intensity, the amount of light, or the color temperature of the external light applied to the front surface of the display panel 100 increases, the main processor 500 may modulate the digital video data so that the luminance or the brightness of the image displayed on the display panel 100 increases according to the increasing characteristic value. Alternatively, the main processor 500 may modulate the digital video data so that the luminance or the brightness of the image displayed on the display panel 100 is changed in inverse proportion to the change in the characteristic value such as the intensity, the color temperature, or the wavelength band of the external light applied to the display panel 100. The digital video data modulated as described above may be supplied to the display driver 200 and be displayed as an image on the display panel 100.

The communicator 600 may perform wired/wireless communication with an external device. For example, the communicator 600 may transmit and receive communication signals to and from the communication module 24 of the touch input device 20. The communicator 600 may receive coordinate data consisting of data codes from the touch input device 20, and may provide the coordinate data to the main processor 500. In addition, when the light characteristic information is input from the main processor 500 or the illuminance sensor 700, the communicator 600 transmits the input light characteristic information to the communication module 24 of the touch input device 20.

The touch input device 20 may be used as a touch input mechanism, and may be configured as an electronic pen such as a smart pen/stylus. The touch input device 20 may be an electronic pen sensing display light of the display panel 100 or light reflected from the display panel 100 using an optical method, and may detect code patterns included in the display panel 100 based on the sensed light and generate coordinate data. Such a touch input device 20 may be an electronic pen having a writing instrument shape, but is not necessarily limited to a writing instrument shape or structure.

The code detector 21 of the touch input device 20 is disposed at a position adjacent to a nib or tip part of the touch input device 20, and senses the code patterns included in the display panel 100. To this end, the code detector 21 includes at least one light emitter 21(a) emitting infrared light using at least one infrared light source, and at least one light receiving unit 21(b) detecting infrared light reflected from the code patterns with an infrared camera.

At least one infrared light source included in the light emitter 21(a) may be configured as an infrared light emitting diode (LED) array having a matrix structure. In addition, the infrared camera of the light receiving unit 21(b) may include a filter cutting off wavelength bands other than infrared light and passing infrared light therethrough, a lens system focusing the infrared light passing through the filter, an optical image sensor converting an optical image formed by the lens system into an electrical image signal and outputting the electrical image signal, and the like. The optical image sensor may be configured as an array having a matrix-structure like the infrared LED array, and may provide shape data of the code patterns to the code processor 23 according to forms of infrared light reflected from the code patterns. In this way, the code detector 21 of the touch input device 20 may continuously detect code patterns included in partial areas of the touch sensor TSU according to user's control and movement, continuously generate shape data of the code patterns, and provide the shape data of the code patterns to the code processor 23.

The code processor 23 may continuously receive the shape data of the code patterns from the code detector 21. For example, the code processor 23 may continuously receive the shape data of the code patterns, and may identify an arrangement structure and a shape of the code patterns. The code processor 23 may extract or generate data codes corresponding to the arrangement structure and the shape of the code patterns, and may combine the data codes with each other to extract or generate coordinate data corresponding to the combined data codes. The code processor 23 may transmit the generated coordinate data to the display device 10 through the communication module 24. For example, the code processor 23 may receive the shape data of the code patterns and generate and convert data codes each corresponding to the code patterns to quickly generate coordinate data generated without complicated calculation and correction.

The code processor 23 may receive light characteristic information of external light detected from the illuminance sensor 700 of the display device 10 through the communication module 24. The code processor 23 may generate and modulate an emission control signal so that an infrared light emission characteristic of the code detector 21 is changed according to a change in the received external light characteristic information. In addition, the code processor 23 may change the infrared light emission characteristic of the code detector 21 by supplying the modulated emission control signal to the light emitting driver 26. For example, the code processor 23 detects the intensity, the amount of light, the color temperature, the brightness, the luminance, and/or the wavelength band included in the light characteristic information from the light characteristic information input through the communication module 24. In addition, an amplitude and a pulse width of the emission control signal may be modulated so that an infrared light emission intensity or wavelength band characteristic of the code detector 21 is changed according to a change in the intensity of light, the amount of light, the color temperature, the brightness, the luminance, and/or the wavelength band.

As an example, the code processor 23 may modulate the emission control signal so that infrared light emission intensity or wavelength band of the code detector 21 is changed in inverse proportion to a change in the intensity, the amount of light, the color temperature, the brightness, the luminance, and/or the wavelength band among the external light characteristic information. Conversely, the code processor 23 may modulate the emission control signal so that infrared light emission intensity or wavelength band of the code detector 21 is changed in proportion to a change in the intensity, the amount of light, the color temperature, the brightness, the luminance, and/or the wavelength band of the external light. The emission control signal modulated as described above is supplied to the light emitting driver 26. Here, the emission control signal of which the amplitude and the pulse width are modulated may be a signal for controlling the driving of the light emitter 21(*a*). Accordingly, the light emitter 21(*a*) of the code processor 23 may emit infrared light so that infrared light emission intensity, emission period, emission wavelength band, and the like, are changed in response to the emission control signal. A method of controlling driving characteristics of the light emitter 21(*a*) of the code processor 23, for example, a method of modulating the emission control signal, will be described later in more detail with reference to the accompanying drawings, graphs, and the like.

The communication module 24 may perform wired/wireless communication with an external device. For example, the communication module 24 may transmit and receive communication signals to and from the communicator 600 of the display device 10. The communication module 24 may receive the coordinate data consisting of the data codes from the code processor 23, and may provide the coordinate data to the communicator 600. In addition, when the light characteristic information on the external light is received from the communicator 600 of the display device 10, the communication module 24 transmits the received light characteristic information to the code processor 23 in real time.

The memory 25 may store data required for driving the touch input device 20. The memory 25 stores shape data of the code patterns and data codes each corresponding to the respective shape data and code patterns. In addition, the memory 25 stores data codes and coordinate data according to a combination of data codes. The memory 25 shares data codes each corresponding to the respective shape data and code patterns, and coordinate data according to a combination of data codes with the code processor 23. Accordingly, the code processor 23 may combine the data codes with each other through the data codes and the coordinate data stored in the memory 25, and may extract or generate coordinate data corresponding to the combined data codes.

Figure 3:
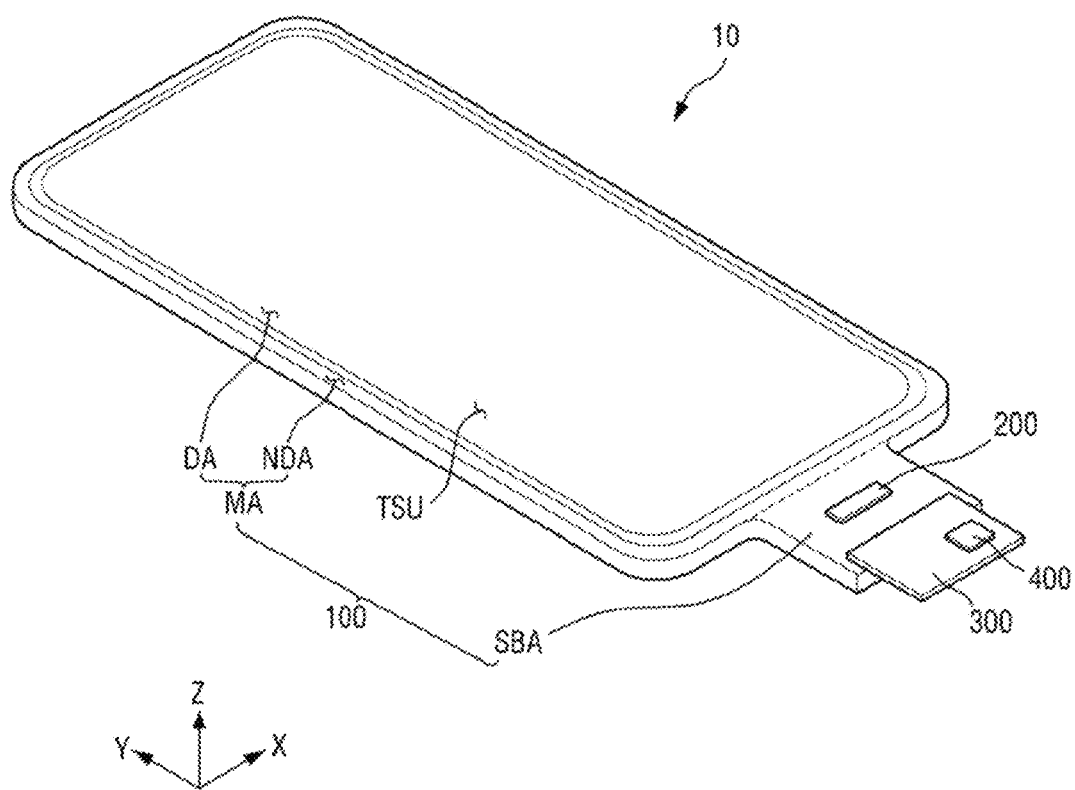
FIG. 3 is a perspective view illustrating a configuration of the display device illustrated in FIG. 2.

FIG. 3 is a perspective view illustrating a configuration of the display device illustrated in FIG. 2. In addition, FIG. 4 is a cross-sectional view illustrating the configuration of the display device illustrated in FIG. 2.

Figure 4:
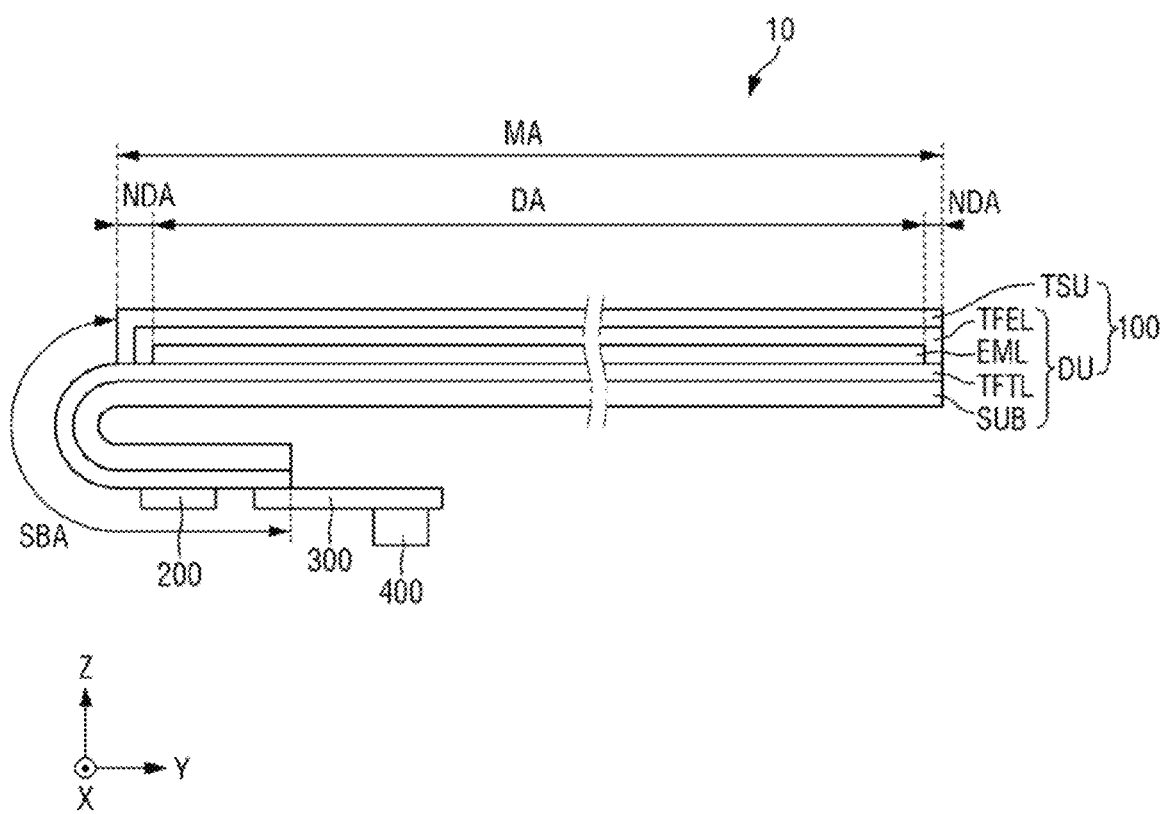
FIG. 4 is a cross-sectional view illustrating the configuration of the display device illustrated in FIG. 2.

Referring to FIGS. 3 and 4, the display device 10 may have a shape that is similar to a rectangular shape, in a plan view. For example, the display device 10 may have a shape that is similar to a rectangular shape, in a plan view, having a pair of short sides extending in an X-axis direction and a pair of long sides extending in a Y-axis direction. A corner where the short side in the X-axis direction and long sides in the Y-axis direction meet may be rounded with a predetermined curvature or may be right-angled. The shape of the display device 10 in a plan view is not necessarily limited to the rectangular shape, and may be a shape similar to a polygonal shape, a circular shape, or an elliptical shape.

The display panel 100 may include a main area MA and a sub-area SBA.

The main area MA may include a display area DA including pixels displaying an image and a non-display area NDA disposed around the display area DA. The display area DA may emit light from a plurality of emission areas or a plurality of opening areas. For example, the display panel 100 may include pixel circuits including switching elements, a pixel defining layer defining the emission areas or the opening areas, and self-light emitting elements.

The non-display area NDA may be an area beyond the display area DA. The non-display area NDA may be defined as an edge area of the main area MA of the display panel 100. The non-display area NDA may include a gate driver supplying gate signals to gate lines, and fan-out lines connecting the display driver 200 and the display area DA to each other.

The sub-area SBA may extend from one side of the main area MA. The sub-area SBA may include a flexible material that may be bent, folded, and rolled. For example, when the sub-area SBA is bent, the sub-area SBA may overlap the main area MA in a thickness direction (Z-axis direction). The sub-area SBA may include the display driver 200 and pad parts connected to the circuit board 300. Optionally, the sub-area SBA may be omitted, and the display driver 200 and the pad parts may be disposed in the non-display area NDA.

The display driver 200 may be formed as an integrated circuit (IC) and be mounted on the display panel 100 in a chip on glass (COG) manner, a chip on plastic (COP) manner, or an ultrasonic bonding manner. As an example, the display driver 200 may be disposed in the sub-area SBA, and may overlap the main area MA in the thickness direction (Z-axis direction) by bending of the sub-area SBA. As an example, the display driver 200 may be mounted on the circuit board 300.

The circuit board 300 may be attached onto the pad parts of the display panel 100 using an anisotropic conductive film (ACF). Lead lines of the circuit board 300 may be electrically connected to pad parts of the display panel 100. The circuit board 300 may be a flexible printed circuit board, a printed circuit board, or a flexible film such as a chip on film.

The touch driver 400 may be mounted on the circuit board 300. The touch driver 400 may be formed as an integrated circuit (IC). As described above, the touch driver 400 may supply the touch driving signals to the plurality of touch electrodes of the touch sensor TSU and sense the change in capacitance between the plurality of touch electrodes. Here, the touch driving signal may be a pulse signal having a predetermined frequency. The touch driver 400 may determine whether a touch input by a user's body part such as a finger has been performed and calculate touch coordinates, based on the change in capacitance between the plurality of touch electrodes.

Referring to FIG. 4, the display panel 100 may include a display DU, a touch sensor TSU, and a polarizing film. The display DU may include a substrate SUB, a thin film transistor layer TFTL, a light emitting element layer EML, and an encapsulation layer TFEL.

The substrate SUB may be a base substrate or a base. The substrate SUB may be a flexible substrate that may be bent, folded, and rolled. As an example, the substrate SUB may include a glass material or a metal material, but is not necessarily limited thereto. As an example, the substrate SUB may include a polymer resin such as polyimide (PI).

The thin film transistor layer TFTL may be disposed on the substrate SUB. The thin film transistor layer TFTL may include a plurality of thin film transistors constituting pixel circuits of pixels. The thin film transistor layer TFTL may further include gate lines, data lines, power lines, gate control lines, fan-out lines connecting the display driver 200 and the data lines to each other, and lead lines connecting the display driver 200 and the pad parts to each other. When the gate driver is formed on one side of the non-display area NDA of the display panel 100, the gate driver may also include thin film transistors.

The thin film transistor layer TFTL may be disposed in the display area DA, the non-display area NDA, and the sub-area SBA. The thin film transistors of each of the pixels, the gate lines, the data lines, and the power lines of the thin film transistor layer TFTL may be disposed in the display area DA. The gate control lines and the fan-out lines of the thin film transistor layer TFTL may be disposed in the non-display area NDA. Lead lines of the thin film transistor layer TFTL may be disposed in the sub-area SBA.

The light emitting element layer EML may be disposed on the thin film transistor layer TFTL. The light emitting element layer EML may include a plurality of light emitting elements, in which a first electrode, a light emitting layer, and a second electrode are sequentially stacked to emit light, and a pixel defining film. The plurality of light emitting elements of the light emitting element layer EML may be disposed in the display area DA. The light emitting layer may be an organic light emitting layer including an organic material. The light emitting layer may include a hole transporting layer, an organic light emitting layer, and an electron transporting layer. When the first electrode receives a predetermined voltage through the thin film transistor of the thin film transistor layer (TFTL) and the second electrode receives a cathode voltage, holes and electrons may move to the organic light emitting layer through the hole transporting layer and the electron transporting layer, respectively, and may be combined with each other in the organic light emitting layer to emit light. For example, the first electrode may be an anode electrode and the second electrode may be a cathode electrode, but the present disclosure is not necessarily limited thereto.

As an example, the plurality of light emitting elements may include quantum dot light emitting diodes including a quantum dot light emitting layer or inorganic light emitting diodes including an inorganic semiconductor.

The encapsulation layer TFEL may cover an upper surface and side surfaces of the light emitting element layer EML, and may protect the light emitting element layer EML. The encapsulation layer TFEL may include at least one inorganic layer and at least one organic layer for encapsulating the light emitting element layer EML.

The touch sensor TSU may be disposed on the encapsulation layer TFEL. The touch sensor TSU may include a plurality of touch electrodes for sensing a user's touch in a capacitive manner and touch lines connecting the plurality of touch electrodes and the touch driver 400 to each other. As an example, the touch sensor TSU may sense the user's touch using a self-capacitance manner or a mutual capacitance manner.

As an example, the touch sensor TSU may be disposed on a separate substrate disposed on the display DU. In this case, the substrate supporting the touch sensor TSU may be a base encapsulating the display DU.

The plurality of touch electrodes of the touch sensor TSU may be disposed in a touch sensor area overlapping the display area DA. The touch lines of the touch sensor TSU may be disposed in a touch peripheral area overlapping the non-display area NDA.

The sub-area SBA of the display panel 100 may extend from one side of the main area MA. The sub-area SBA may include a flexible material that may be bent, folded, and rolled. For example, when the sub-area SBA is bent, the sub-area SBA may overlap the main area MA in the thickness direction (Z-axis direction). The sub-area SBA may include the display driver 200 and the pad parts connected to the circuit board 300.

Figure 5:
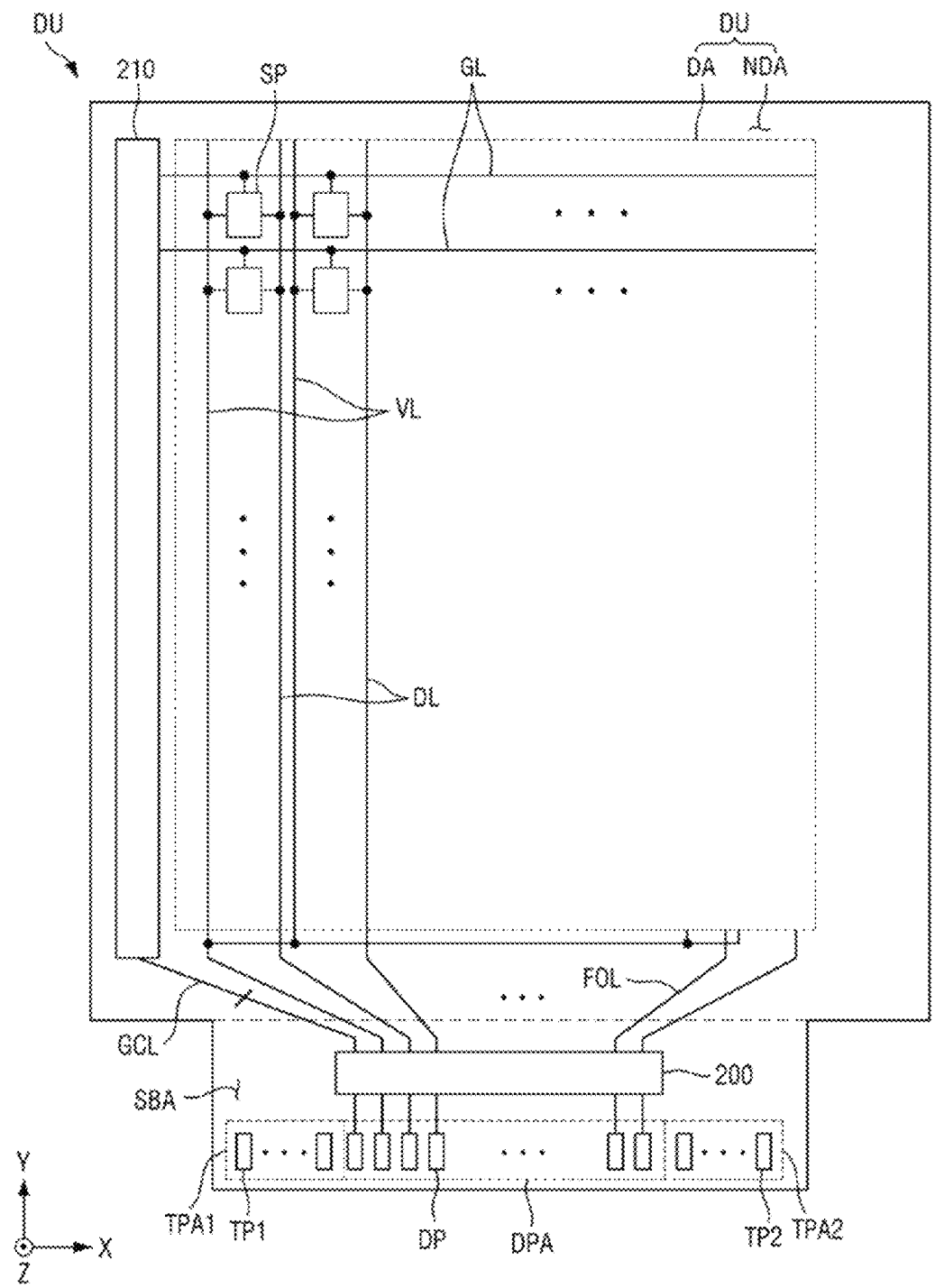
FIG. 5 is a plan view illustrating a display of the display device according to an embodiment.

FIG. 5 is a plan view illustrating a display of the display device according to an embodiment.

Referring to FIG. 5, the display area DA of the display DU is an area displaying an image, and may be defined as a central area of the display panel 100. The display area DA may include a plurality of pixels SP, a plurality of gate lines GL, a plurality of data lines DL, and a plurality of power lines VL. Each of the plurality of pixels SP may be defined as a minimum unit outputting light.

The plurality of gate lines GL may supply gate signals received from a gate driver 210 to the plurality of pixels SP. The plurality of gate lines GL may extend in the X-axis direction, and may be spaced apart from each other in the Y-axis direction crossing the X-axis direction.

The plurality of data lines DL may supply data voltages received from the display driver 200 to the plurality of pixels SP. The plurality of data lines DL may extend in the Y-axis direction, and may be spaced apart from each other in the X-axis direction.

The plurality of power lines VL may supply a source voltage received from the display driver 200 to the plurality of pixels SP. Here, the source voltage may be a driving voltage, an initialization voltage, and/or a reference voltage. The plurality of power lines VL may extend in the Y-axis direction and may be spaced apart from each other in the X-axis direction.

The non-display area NDA of the display DU may at least partially surround the display area DA. The non-display area NDA may include the gate driver 210, fan-out lines FOL, and gate control lines GCL. The gate driver 210 may generate a plurality of gate signals based on gate control signals, and may sequentially supply the plurality of gate signals to the plurality of gate lines GL according to a set order.

The fan-out lines FOL may extend from the display driver 200 to the display area DA. The fan-out lines FOL may supply the data voltages received from the display driver 200 to the plurality of data lines DL.

The gate control lines GCL may extend from the display driver 200 to the gate driver 210. The gate control lines GCL may supply the gate control signals received from the display driver 200 to the gate driver 210.

The sub-area SBA may include the display driver 200, a display pad area DPA, and first and second touch pad areas TPA1 and TPA2.

The display driver 200 may output signals and voltages for driving the display panel 100 to the fan-out lines FOL. The display driver 200 may supply the data voltages to the data lines DL through the fan-out lines FOL. The data voltages may be supplied to the plurality of pixels SP, and may determine luminance of the plurality of pixels SP. The display driver 200 may supply the gate control signals to the gate driver 210 through the gate control lines GCL.

The display pad area DPA, the first touch pad area TPA1, and the second touch pad area TPA2 may be disposed at an edge of the sub-area SBA. The display pad area DPA, the first touch pad area TPA1, and the second touch pad area TPA2 may be electrically connected to the circuit board 300 using an anisotropic conductive film or a low-resistance high-reliability material such as a super absorbent polymer (SAP).

The display pad area DPA may include a plurality of display pad parts DP. The plurality of display pad parts DP may be connected to the main processor 500 through the circuit board 300. The plurality of display pad parts DP may be connected to the circuit board 300 to receive digital video data, and may supply the digital video data to the display driver 200.

Figure 6:
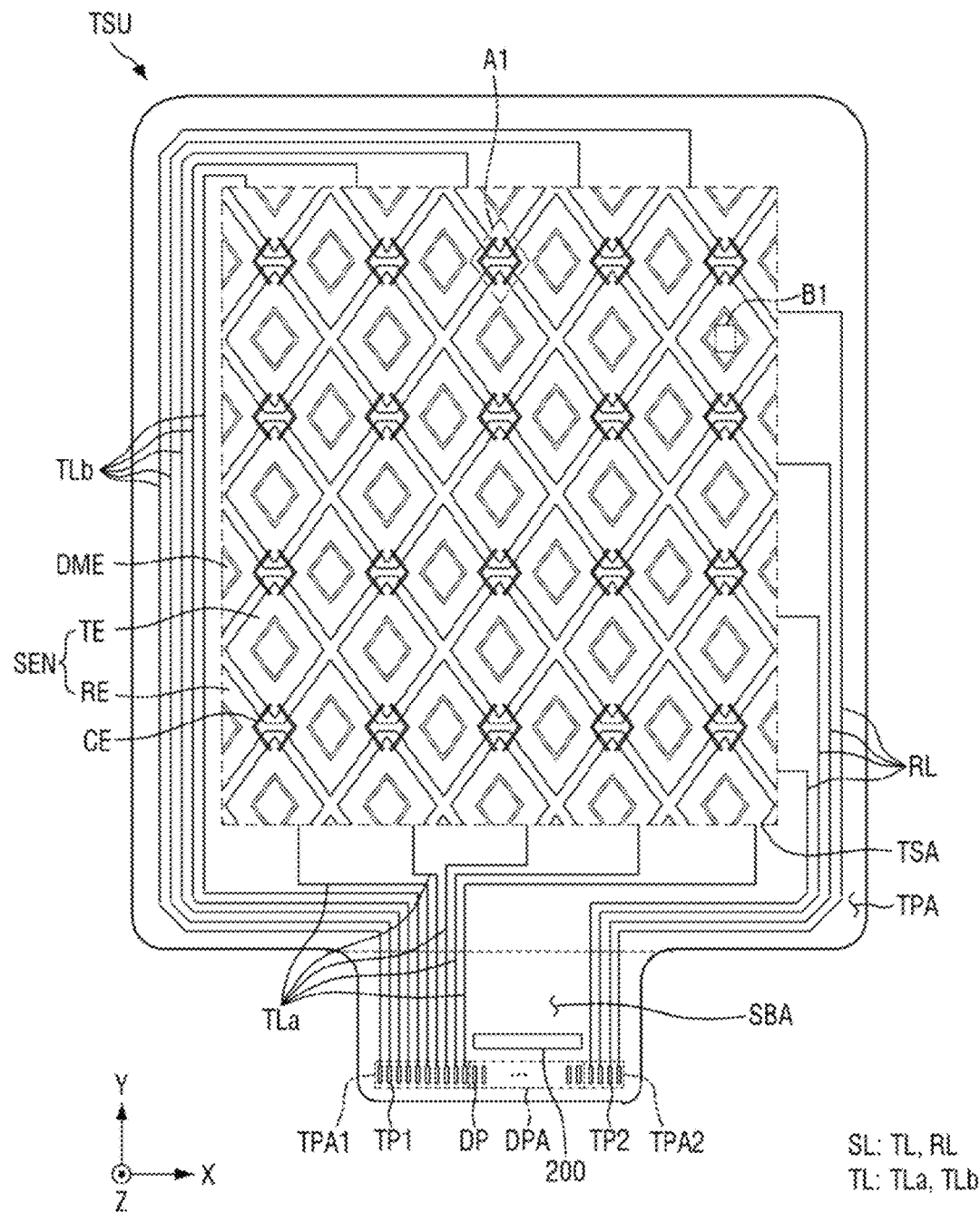
FIG. 6 is a plan view illustrating a touch sensor of the display device according to an embodiment.

FIG. 6 is a plan view illustrating a touch sensor of the display device according to an embodiment.

Referring to FIG. 6, the touch sensor TSU may include a touch sensor area TSA sensing a user's touch and a touch peripheral area TPA disposed around the touch sensor area TSA. The touch sensor area TSA may overlap the display area DA of the display DU, and the touch peripheral area TPA may overlap the non-display area NDA of the display DU.

The touch sensor area TSA may include a plurality of touch electrodes SEN and a plurality of dummy electrodes DME. The plurality of touch electrodes SEN may form mutual capacitance or self-capacitance to sense a touch of an object or a person. The plurality of touch electrodes SEN may include a plurality of driving electrodes TE and a plurality of sensing electrodes RE.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through a plurality of connection electrodes CE.

The plurality of driving electrodes TE may be connected to first touch pad parts TP1 through driving lines TL. The driving lines TL may include lower driving lines TLa and upper driving lines TLb. For example, some driving electrodes TE disposed on the lower side of the touch sensor area TSA may be connected to the first touch pad parts TP1 through the lower driving lines TLa, and some other driving electrodes TE disposed on the upper side of the touch sensor area TSA may be connected to the first touch pad parts TP1 through the upper driving lines TLb. The lower driving lines TLa may extend to the first touch pad parts TP1 beyond the lower side of the touch peripheral area TPA. The upper driving lines TLb may extend to the first touch pad parts TP1 via the upper, left, and lower sides of the touch peripheral area TPA. The first touch pad parts TP1 may be connected to the touch driver 400 through the circuit board 300.

The connection electrode CE may be bent at least once. For example, the connection electrode CE may have a clamp shape ("<" or ">"), but a shape of the connection electrode CE in a plan view is not necessarily limited thereto. The driving electrodes TE adjacent to each other in the Y-axis direction may be electrically connected to each other by the plurality of connection electrodes CE, and even though any one of the plurality of connection electrodes CE is disconnected, the driving electrodes TE may be stably connected to each other through the other connection electrodes CE. The driving electrodes TE adjacent to each other may be connected to each other by two connection electrodes CE, but the number of connection electrodes CE is not necessarily limited thereto.

The connection electrodes CE may be disposed at a different layer from the plurality of driving electrodes TE and the plurality of sensing electrodes RE. The sensing electrodes RE adjacent to each other in the X-axis direction may be electrically connected to each other through a connection part disposed at the same layer as the plurality of driving electrodes TE or the plurality of sensing electrodes RE. For example, the plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other through the connection part.

The driving electrodes TE adjacent to each other in the Y-axis direction may be electrically connected to each other through the connection electrodes CE disposed at the different layer from the plurality of driving electrodes TE and the plurality of sensing electrodes RE. The connection electrodes CE may be formed at a rear surface layer (or a lower layer) of a layer at which the driving electrodes TE and the sensing electrodes RE are formed. The connection electrodes CE are electrically connected to the respective adjacent driving electrodes TE through a plurality of contact holes. Accordingly, even though the connection electrodes CE overlap the plurality of sensing electrodes RE in the Z-axis direction, the plurality of driving electrodes TE and the plurality of sensing electrodes RE may be insulated from each other. Mutual capacitance may be formed between the driving electrodes TE and the sensing electrodes RE.

The plurality of sensing electrodes RE may be connected to second touch pad parts TP2 through sensing lines RL. For example, some sensing electrodes RE disposed on the right side of the touch sensor area TSA may be connected to the second touch pad parts TP2 through the sensing lines RL. The sensing lines RL may extend to the second touch pad parts TP2 via the right side and the lower side of the touch peripheral area TPA. The second touch pad parts TP2 may be connected to the touch driver 400 through the circuit board 300.

Each of the plurality of dummy electrodes DE may be at least partially surrounded by the driving electrode TE or the sensing electrode RE. Each of the plurality of dummy electrodes DE may be spaced apart and insulated from the driving electrode TE or the sensing electrode RE. Accordingly, the dummy electrode DE may be electrically floated.

Code patterns having a planar code shape are formed at preset intervals on partial areas of a front surface of at least one of the plurality of driving electrodes TE, the plurality of sensing electrodes RE, and the plurality of dummy electrodes DE. In addition, dummy patterns for blocking light are formed in various shapes on portions of a front surface of the plurality of touch electrodes on which the code patterns are not formed, so as not to overlap the code patterns.

The display pad area DPA, the first touch pad area TPA1, and the second touch pad area TPA2 may be disposed at an edge of the sub-area SBA. The display pad area DPA, the first touch pad area TPA1, and the second touch pad area TPA2 may be electrically connected to the circuit board 300 using an anisotropic conductive film or a low-resistance high-reliability material such as a super absorbent polymer (SAP).

The first touch pad area TPA1 may be disposed on one side of the display pad area DPA, and may include a plurality of first touch pad parts TP1. The plurality of first touch pad parts TP1 may be electrically connected to the touch driver 400 disposed on the circuit board 300. The plurality of first touch pad parts TP1 may supply the touch driving signals to the plurality of driving electrodes TE through a plurality of driving lines TL.

The second touch pad area TPA2 may be disposed on the other side of the display pad area DPA, and may include a plurality of second touch pad parts TP2. The plurality of second touch pad parts TP2 may be electrically connected to the touch driver 400 disposed on the circuit board 300. The touch driver 400 may receive touch sensing signals through a plurality of sensing lines RL connected to the plurality of second touch pad parts TP2, and may sense a change in mutual capacitance between the driving electrodes TE and the sensing electrodes RE.

As an example, the touch driver 400 may supply a touch driving signal to each of the plurality of driving electrodes TE and the plurality of sensing electrodes RE, and may receive a touch sensing signal from each of the plurality of driving electrodes TE and the plurality of sensing electrodes RE. The touch driver 400 may sense an amount of change in charge of each of the plurality of driving electrodes TE and the plurality of sensing electrodes RE based on the touch sensing signal.

Figure 7:
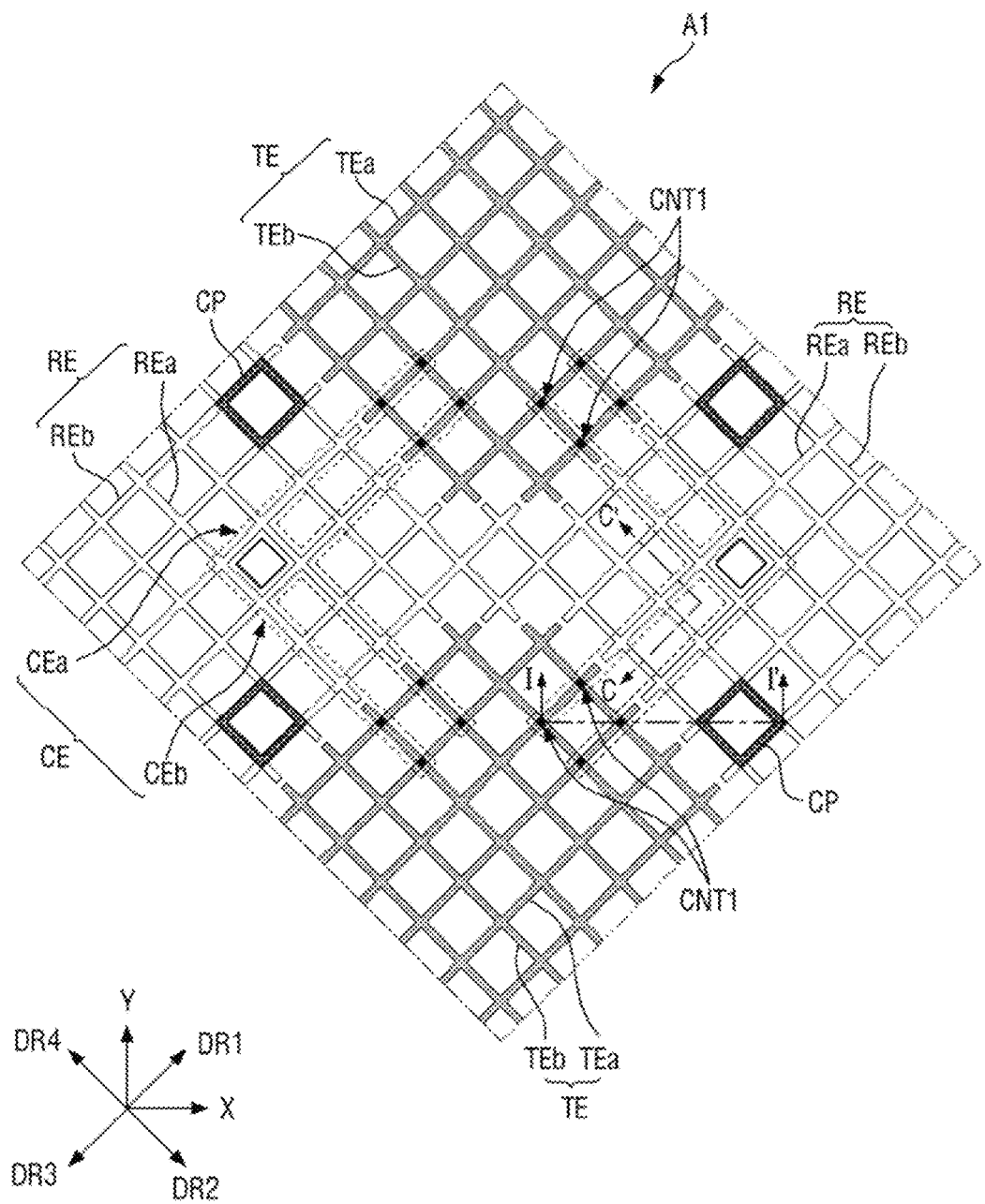
FIG. 7 is an enlarged view illustrating area A1 of FIG. 6 and code patterns according to an embodiment.

FIG. 7 is an enlarged view illustrating area A1 of FIG. 6 and code patterns according to an embodiment. In addition, FIG. 8 is an enlarged view illustrating area B1 of FIG. 6 and code patterns according to an embodiment.

Figure 8:
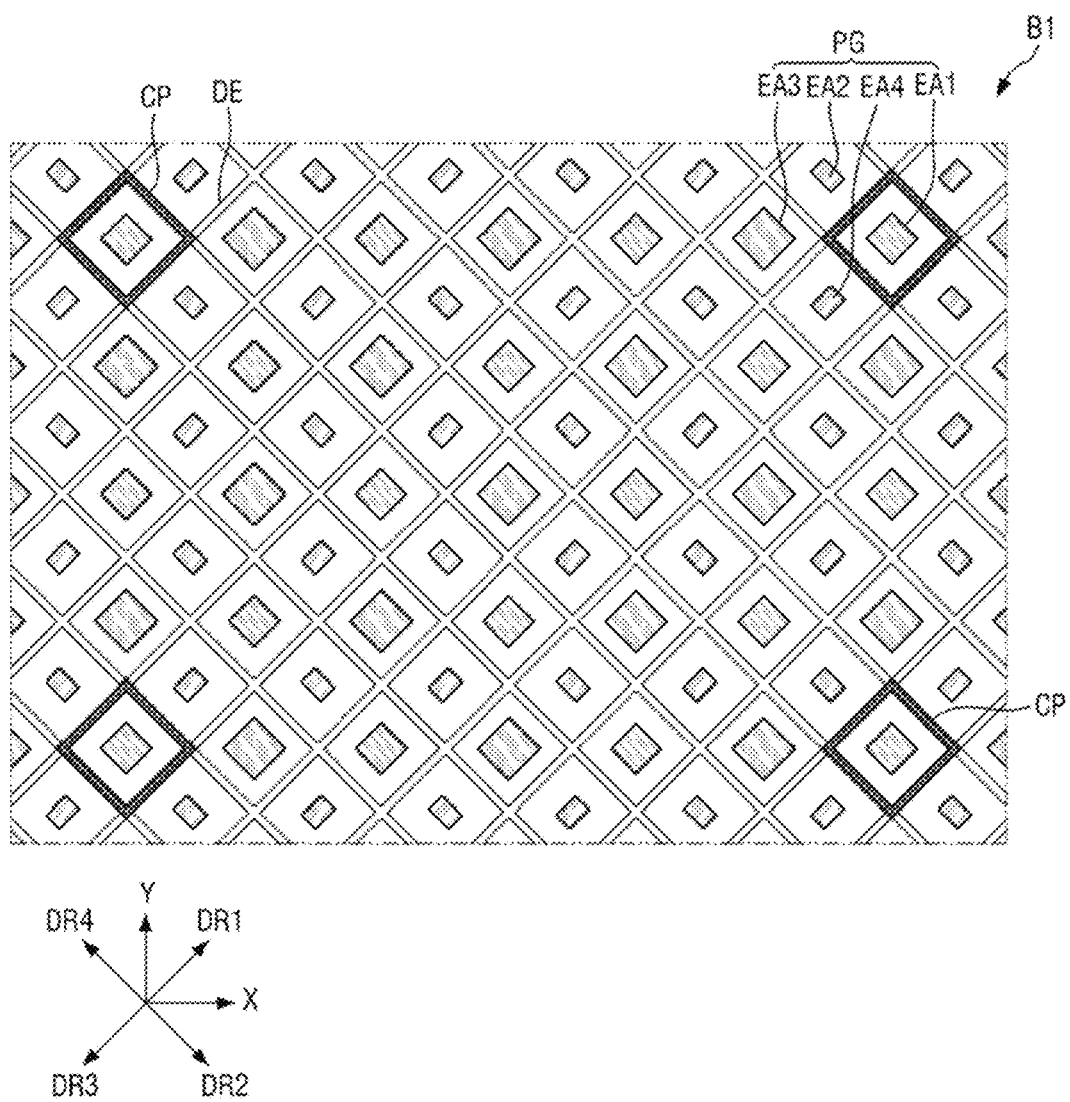
FIG. 8 is an enlarged view illustrating area B1 of FIG. 6 and code patterns according to an embodiment.

Referring to FIGS. 7 and 8, the plurality of driving electrodes TE, the plurality of sensing electrodes RE, and the plurality of dummy electrodes DE may be disposed at the same layer and may be spaced apart from each other.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent to each other in the Y-axis direction may be electrically connected to each other through the connection electrodes CE.

The plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent to each other in the X-axis direction may be electrically connected to each other. For example, the sensing electrodes RE may be electrically connected to each other through the connection part, and the connection part may be disposed within the shortest distance between the driving electrodes TE adjacent to each other.

The plurality of connection electrodes CE may be disposed at a different layer from the driving electrodes TE and the sensing electrodes RE, for example, a rear surface layer. The connection electrode CE may include a first portion CEa and a second portion CEb. For example, the first portion CEa of the connection electrode CE may be connected to the driving electrode TE disposed on one side through a first contact hole CNT1 and may extend in a third direction DR3. The second portion CEb of the connection electrode CE may be bent from the first portion CEa in an area overlapping the sensing electrode RE, may extend in a second direction DR2, and may be connected to the driving electrode TE disposed on the other side through a first contact hole CNT1. Hereinafter, a first direction DR1 may be a direction between the X-axis direction and the Y-axis direction, the second direction DR2 may be a direction between an opposite direction to the Y-axis direction and the X-axis direction, the third direction DR3 may be an opposite direction to the first direction DR1, and the fourth direction DR4 may be an opposite direction to the second direction DR2. Accordingly, each of the plurality of connection electrodes CE may connect the driving electrodes TE adjacent to each other in the Y-axis direction to each other.

As illustrated in FIG. 8, the plurality of pixels may include first to third sub-pixels or first to fourth sub-pixels, and each of the first to fourth sub-pixels may include first to fourth emission areas EA1 to EA4. For example, the first emission area EA1 may emit light of a first color (e.g., red light), the second emission area EA2 may emit light of a second color (e.g., green light), and the third emission area EA3 may emit light of a third color (e.g., blue light). In addition, the fourth emission area EA4 may emit light of a fourth color or light of any one of the first to third colors, but is not necessarily limited thereto.

One pixel group PG may express a white gradation through the first to third emission areas EA1 to EA3 or the first to fourth emission areas EA1 to EA4. In addition, gradations of various colors such as white may be expressed by a combination of light emitted from the first to third emission areas EA1 to EA3 or the first to fourth emission areas EA1 to EA4.

According to an arrangement structure of the first to third sub-pixels or the first to fourth sub-pixels, the plurality of driving electrodes TE, the plurality of sensing electrodes RE, and the plurality of dummy electrodes DE may be formed in a mesh structure or a net structure in a plan view.

The plurality of driving electrodes TE, the plurality of sensing electrodes RE, and the plurality of dummy electrodes DE may at least partially surround each of the first to third emission areas EA1 to EA3 or the first to fourth emission areas EA1 to EA4 constituting the pixel group PG in a plan view. Accordingly, the plurality of driving electrodes TE, the plurality of sensing electrodes RE, and the plurality of dummy electrodes DE might not overlap the first to fourth emission areas EA1 to EA4. The plurality of connection electrodes CE might also not overlap the first to fourth emission areas EA1 to EA4. Accordingly, the display device 10 may prevent luminance of the light emitted from the first to fourth emission areas EA1 to EA4 from being decreased by the touch sensor TSU.

Each of the plurality of driving electrodes TE may include a first portion TEa extending in the first direction DR1 and a second portion TEb extending in the second direction DR2, and might not overlap the first to fourth emission areas EA1 to EA4. In addition, each of the plurality of sensing electrodes RE may include a first portion REa extending in the first direction DR1 and a second portion REb extending in the second direction DR2, and might not overlap the first to fourth emission areas EA1 to EA4. The plurality of dummy electrodes DE also do not overlap the first to fourth emission areas EA1 to EA4.

When code patterns CP are formed on some of the plurality of touch electrodes SEN, the code patterns CP may be formed at predetermined intervals (e.g., intervals of 300 μm) on partial areas of front surfaces of the plurality of dummy electrodes DE, the plurality of driving electrodes TE, and the plurality of sensing electrodes RE. In this case, on partial areas of front surfaces of the plurality of dummy electrodes DE, the plurality of driving electrodes TE, and the plurality of sensing electrodes RE in which the code patterns CP are not formed, dummy patterns for blocking light may be formed in various shapes so as not to overlap the code patterns CP. When the code patterns CP are formed on some of the plurality of touch electrodes SEN, the code patterns CP are formed of light blockers made of a material absorbing light, and the respective light blockers cover partial areas of a front surface of at least one of the plurality of driving electrodes TE, the plurality of sensing electrodes RE, and the plurality of dummy electrodes DE in a planar code shape having a preset size. In this case, the light blockers may cover not only partial areas of the front surfaces of the respective electrodes, but also at least one side surfaces of the respective electrodes together with the front surfaces.

The planar code shape of the code patterns CP may be formed as a closed loop shape such as a rectangular shape, a square shape, a circular shape, or a rhombic shape. Alternatively, the planar code shape of the code patterns CP may be formed as an open loop shape surrounding only a portion of one emission area. In addition, the planar code shape of the code patterns CP may be formed as a straight line or curved shape having a preset length. Meanwhile, when the code patterns CP surround portions between and circumferences of the plurality of emission areas rather than one emission area, an overall shape of the code patterns CP may be formed as a mesh structure and a net structure in a plan view.

Referring to FIG. 8, a plurality of light blockers forming code patterns CP and dummy patterns for blocking light may also be formed on partial areas of the front surfaces of the dummy electrodes DE.

The light blockers constituting the code patterns CP may be patterned and formed in a preset planar code shape on the dummy electrodes DE, and the light blockers constituting the dummy patterns for blocking light may be patterned and formed in a shape such as a preset straight line shape or curve shape.

Figure 9:
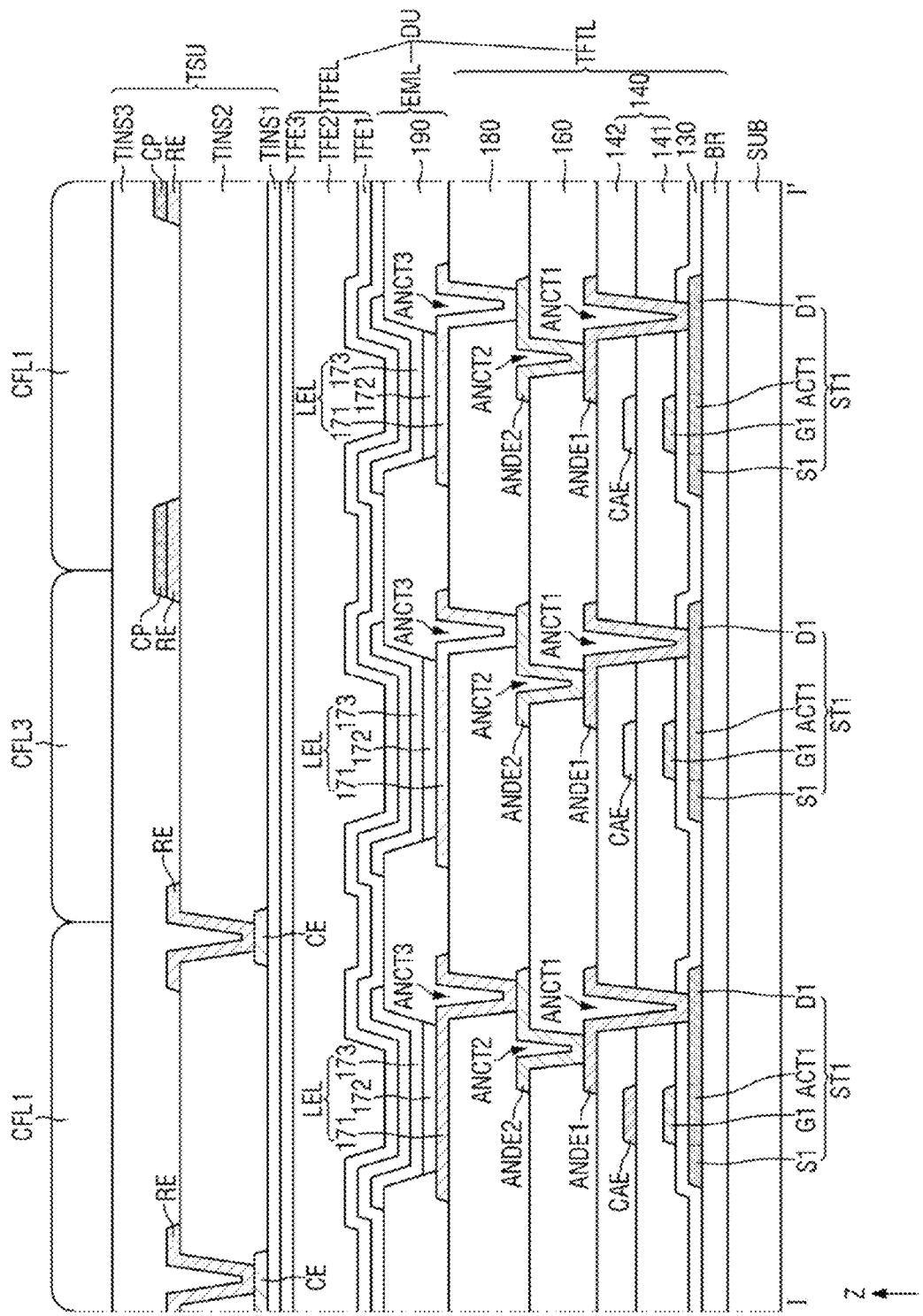
FIG. 9 is a cross-sectional view illustrating a cross-sectional structure taken along line I-I' of FIG. 7 according to an embodiment.

FIG. 9 is a cross-sectional view illustrating a cross-sectional structure taken along line I-I' of FIG. 7 according to an embodiment.

Referring to FIG. 9, a barrier layer BR may be disposed on a substrate SUB. The substrate SUB may be made of an electrically insulating material such as a polymer resin. For example, the substrate SUB may be made of polyimide. The substrate SUB may be a flexible substrate that may be bent, folded, and rolled to a noticeable extent without cracking or otherwise sustaining damage thereto.

The barrier layer BR is a film for protecting transistors of a thin film transistor layer TFTL and light emitting layers 172 of a light emitting element layer EML from moisture permeating through the substrate SUB vulnerable to moisture permeation. The barrier layer BR may include a plurality of inorganic layers that are alternately stacked. For example, the barrier layer BR may be formed as multiple layers in which one or more inorganic layers of a silicon nitride layer, a silicon oxynitride layer, a silicon oxide layer, a titanium oxide layer, and an aluminum oxide layer are alternately stacked.

Thin film transistors ST1 may be disposed on the barrier layer BR. Each of the thin film transistors ST1 includes an active layer ACT1, a gate electrode G1, a source electrode S1, and a drain electrode D1.

The active layer ACT1, the source electrode S1, and the drain electrode D1 of each of the thin film transistors ST1 may be disposed on the barrier layer BR. The active layer ACT1 of the thin film transistor ST1 includes polycrystalline silicon, single crystal silicon, low-temperature polycrystalline silicon, amorphous silicon, or an oxide semiconductor. The active layer ACT1 overlapping the gate electrode G1 in the third direction (Z-axis direction), which is the thickness direction of the substrate SUB, may be defined as a channel region. The source electrode S1 and the drain electrode D1 are regions that do not overlap the gate electrode G1 in the third direction (Z-axis direction), and may have electrical conductivity by doping a silicon semiconductor or an oxide semiconductor with ions or impurities.

A gate insulating layer 130 may be disposed on the active layer ACT1, the source electrode S1, and the drain electrode D1 of each of the thin film transistors ST1. The gate insulating layer 130 may be formed as an inorganic layer, for example, a silicon nitride layer, a silicon oxynitride layer, a silicon oxide layer, a titanium oxide layer, or an aluminum oxide layer.

The gate electrode G1 of the thin film transistor ST1 may be disposed on the gate insulating layer 130. The gate electrode G1 may overlap the active layer ACT1 in the third direction (Z-axis direction). The gate electrode G1 may be formed as a single layer or multiple layers including molybdenum (Mo), aluminum (Al), chromium (Cr), gold (Au), titanium (Ti), nickel (Ni), neodymium (Nd), and/or copper (Cu), or alloys thereof.

A first interlayer insulating layer 141 may be disposed on the gate electrode G1 of the thin film transistor ST1. The first interlayer insulating layer 141 may be formed as an inorganic layer, for example, a silicon nitride layer, a silicon oxynitride layer, a silicon oxide layer, a titanium oxide layer, or an aluminum oxide layer. The first interlayer insulating layer 141 may be formed as a plurality of inorganic layers.

A capacitor electrode CAE may be disposed on the first interlayer insulating layer 141. The capacitor electrode CAE may overlap the gate electrode G1 of the first thin film transistor ST1 in the third direction (Z-axis direction). Since the first interlayer insulating layer 141 has a predetermined dielectric constant, a capacitor may be formed by the capacitor electrode CAE, the gate electrode G1, and the first interlayer insulating layer 141 disposed between the capacitor electrode CAE and the gate electrode G1. The capacitor electrode CAE may be formed as a single layer or multiple layers including molybdenum (Mo), aluminum (Al), chromium (Cr), gold (Au), titanium (Ti), nickel (Ni), neodymium (Nd), and/or copper (Cu), or alloys thereof.

A second interlayer insulating layer 142 may be disposed on the capacitor electrode CAE. The second interlayer insulating layer 142 may be formed as an inorganic layer, for example, a silicon nitride layer, a silicon oxynitride layer, a silicon oxide layer, a titanium oxide layer, or an aluminum oxide layer. The second interlayer insulating layer 142 may be formed as a plurality of inorganic layers.

A first anode connection electrode ANDE1 may be disposed on the second interlayer insulating layer 142. The first anode connection electrode ANDE1 may be connected to the drain electrode D1 of the thin film transistor ST1 through a first connection contact hole ANCT1 penetrating through the gate insulating layer 130, the first interlayer insulating layer 141, and the second interlayer insulating layer 142. The first anode connection electrode ANDE1 may be formed as a single layer or multiple layers including molybdenum (Mo), aluminum (Al), chromium (Cr), gold (Au), titanium (Ti), nickel (Ni), neodymium (Nd), and/or copper (Cu), or alloys thereof.

A first planarization layer 160 for planarizing a step due to the thin film transistor ST1 may be disposed on the first anode connection electrode ANDE1. The first planarization layer 160 may be formed as an organic layer made of an acrylic resin, an epoxy resin, a phenolic resin, a polyamide resin, a polyimide resin, or the like.

A second anode connection electrode ANDE2 may be disposed on the first planarization layer 160. The second anode connection electrode ANDE2 may be connected to the first anode connection electrode ANDE1 through a second connection contact hole ANCT2 penetrating through the first planarization layer 160. The second anode connection electrode ANDE2 may be formed as a single layer or multiple layers including molybdenum (Mo), aluminum (Al), chromium (Cr), gold (Au), titanium (Ti), nickel (Ni), neodymium (Nd), and/or copper (Cu), or alloys thereof.

A second planarization layer 180 may be disposed on the second anode connection electrode ANDE2. The second planarization layer 180 may be formed as an organic layer made of an acrylic resin, an epoxy resin, a phenolic resin, a polyamide resin, a polyimide resin, or the like.

Light emitting elements LEL and a bank 190 may be disposed on the second planarization layer 180. Each of the light emitting elements LEL includes a pixel electrode 171, a light emitting layer 172, and a common electrode 173.

The pixel electrode 171 may be disposed on the second planarization layer 180. The pixel electrode 171 may be connected to the second anode connection electrode ANDE2 through a third connection contact hole ANCT3 penetrating through the second planarization layer 180.

In a top emission structure in which light is emitted toward the common electrode 173 based on the light emitting layer 172, the pixel electrode 171 may be formed of a metal material having high reflectivity of light, such as a stacked structure (Ti/Al/Ti) of aluminum and titanium, a stacked structure (ITO/Al/ITO) of aluminum and indium tin oxide (ITO), an APC alloy, and a stacked structure (ITO/APC/ITO) of an APC alloy and ITO. The APC alloy is an alloy of silver (Ag), palladium (Pd), and copper (Cu).

The bank 190 may partition the pixel electrode 171 on the second planarization layer 180 to define the first to third emission areas EA1 to EA3. The bank 190 may cover an edge of the pixel electrode 171. The bank 190 may be formed as an organic layer made of an acrylic resin, an epoxy resin, a phenolic resin, a polyamide resin, a polyimide resin, or the like.

Each of the first to third emission areas EA1 to EA3 refers to an area in which the pixel electrode 171, the light emitting layer 172, and the common electrode 173 are sequentially stacked and holes from the pixel electrode 171 and electrons from the common electrode 173 are combined with each other in the light emitting layer 172 to emit light.

The light emitting layer 172 may be disposed on the pixel electrode 171 and the bank 190. The light emitting layer 172 may include an organic material to emit light of a predetermined color. For example, the light emitting layer 172 includes a hole transporting layer, an organic material layer, and an electron transporting layer.

The common electrode 173 may be disposed on the light emitting layer 172. The common electrode 173 may cover the light emitting layer 172. The common electrode 173 may be a common layer commonly formed in the first emission area EA1, the second emission area EA2, and the third emission area EA3. A capping layer may be formed on the common electrode 173.

In the top emission structure, the common electrode 173 may be formed of a transparent conductive material (TCO) such as ITO or indium zinc oxide (IZO) capable of transmitting light therethrough or a semi-transmissive conductive material such as magnesium (Mg), silver (Ag), or an alloy of magnesium (Mg) and silver (Ag). When the common electrode 173 is formed of the semi-transmissive conductive material, emission efficiency may be increased by a micro cavity.

An encapsulation layer TFEL may be disposed on the common electrode 173. The encapsulation layer TFEL includes at least one inorganic layer to prevent oxygen or moisture from permeating into the light emitting element layer EML. In addition, the encapsulation layer TFEL includes at least one organic layer to protect the light emitting element layer EML from foreign materials such as dust. For example, the encapsulation layer TFEL includes a first encapsulation inorganic layer TFE1, an encapsulation organic layer TFE2, and a second encapsulation inorganic layer TFE3.

The first encapsulation inorganic layer TFE1 may be disposed on the common electrode 173, the encapsulation organic layer TFE2 may be disposed on the first encapsulation inorganic layer TFE1, and the second encapsulation inorganic layer TFE3 may be disposed on the encapsulation organic layer TFE2. The first encapsulation inorganic layer TFE1 and the second encapsulation inorganic layer TFE3 may be formed as multiple layers in which one or more inorganic layers of a silicon nitride layer, a silicon oxynitride layer, a silicon oxide layer, a titanium oxide layer, and an aluminum oxide layer are alternately stacked. The encapsulation organic layer TFE2 may be an organic layer made of an acrylic resin, an epoxy resin, a phenolic resin, a polyamide resin, a polyimide resin, or the like.

A touch sensor TSU may be disposed on the encapsulation layer TFEL. The touch sensor TSU includes a first touch insulating layer TINS1, the connection electrodes CE, a second touch insulating layer TINS2, the driving electrodes TE, the sensing electrodes RE, and a third touch insulating layer TINS3.

The first touch insulating layer TINS1 may be formed as an inorganic layer, for example, a silicon nitride layer, a silicon oxynitride layer, a silicon oxide layer, a titanium oxide layer, or an aluminum oxide layer.

The connection electrodes CE may be disposed on the first touch insulating layer TINS1. The connection electrode CE may be formed as a single layer or multiple layers including molybdenum (Mo), aluminum (Al), chromium (Cr), gold (Au), titanium (Ti), nickel (Ni), neodymium (Nd), and/or copper (Cu), or alloys thereof.

The second touch insulating layer TINS2 is disposed on the first touch insulating layer TINS1 including the connection electrodes CE. The second touch insulating layer TINS2 may be formed as an inorganic layer, for example, a silicon nitride layer, a silicon oxynitride layer, a silicon oxide layer, a titanium oxide layer, or an aluminum oxide layer. Alternatively, the second touch insulating layer TINS2 may be formed as an organic layer made of an acrylic resin, an epoxy resin, a phenolic resin, a polyamide resin, a polyimide resin, or the like.

The driving electrodes TE and the sensing electrodes RE may be disposed on the second touch insulating layer TINS2. In addition, the dummy electrodes DE, the lower driving lines TLa, the upper driving lines TLb, and the sensing lines RL illustrated in FIG. 6 as well as the driving electrodes TE and the sensing electrodes RE may be disposed on the second touch insulating layer TINS2.

The driving electrodes TE, the sensing electrodes RE, and the dummy electrodes DE are formed as conductive metal electrodes, which are formed of molybdenum (Mo), aluminum (Al), chromium (Cr), gold (Au), titanium (Ti), nickel (Ni), neodymium (Nd), and/or copper (Cu), or alloys thereof. The driving electrodes TE, the sensing electrodes RE, and the dummy electrodes DE are formed in a mesh structure or a net structure so as not to overlap the emission areas EA1 to EA4. Each driving electrode TE and sensing electrode RE may partially overlap the connection electrode CE in the third direction (Z-axis direction). The driving electrode TE may be connected to the connection electrode CE through a touch contact hole TCNT1 penetrating through the second touch insulating layer TINS2.

The light blockers are applied to partial areas of front surfaces of the driving electrodes TE, the sensing electrodes RE, and the dummy electrodes DE, and are patterned in a preset planar code shape, such that the code patterns CP are formed and disposed on partial areas of the front surfaces of the driving electrodes TE, the sensing electrodes RE, and the dummy electrodes DE. In a process of patterning such code patterns CP, dummy patterns for blocking light may also be formed simultaneously with the code patterns CP.

The light blocker constituting the code patterns CP and the dummy patterns for blocking light may be formed of materials including an infrared or ultraviolet absorbing material. For example, the light blocker may be formed of a material including an inorganic or organic black pigment. Here, the inorganic black pigment may be a pigment including carbon black, cyanine, polymethine, anthraquinone, and/or phthalocyanine-based compounds. For example, the organic black pigment may include lactam black, perylene black, and/or aniline black, but is not necessarily limited thereto.

The third touch insulating layer TINS3 is formed on the respective driving electrodes TE and sensing electrodes RE including the code patterns CP. The third touch insulating layer TINS3 may serve to planarize a step formed due to the driving electrodes TE, the sensing electrodes RE, and the connection electrodes CE. The third touch insulating layer TINS3 may be formed as an inorganic layer, for example, a silicon nitride layer, a silicon oxynitride layer, a silicon oxide layer, a titanium oxide layer, or an aluminum oxide layer. Alternatively, the third touch insulating layer TINS3 may be formed as an organic layer made of an acrylic resin, an epoxy resin, a phenolic resin, a polyamide resin, a polyimide resin, or the like.

A plurality of color filter layers CFL1 and CFL3 may be formed on the touch sensor TSU. As an example, the plurality of color filter layers CFL1 and CFL3 may be disposed on the third touch insulating layer TINS3 in a planar shape.

The respective color filter layers may be formed on the third touch insulating layer TINS3 to overlap the first to fourth emission areas EA1 to EA4, respectively, but may also be formed on the second touch insulating layer TINS2 including the driving electrodes TE and the sensing electrodes RE so as to overlap the first to fourth emission areas EA1 to EA4, respectively. Here, a first color filter CFL1 may be disposed on the first emission area EA1 emitting the light of the first color, a second color filter may be disposed on the second emission area EA2 emitting the light of the second color, and a third color filter CFL3 may be disposed on the third emission area EA3 emitting the light of the third color. In addition, the second color filter may also be disposed on the fourth emission area EA4 emitting the light of the second color.

Figure 10:
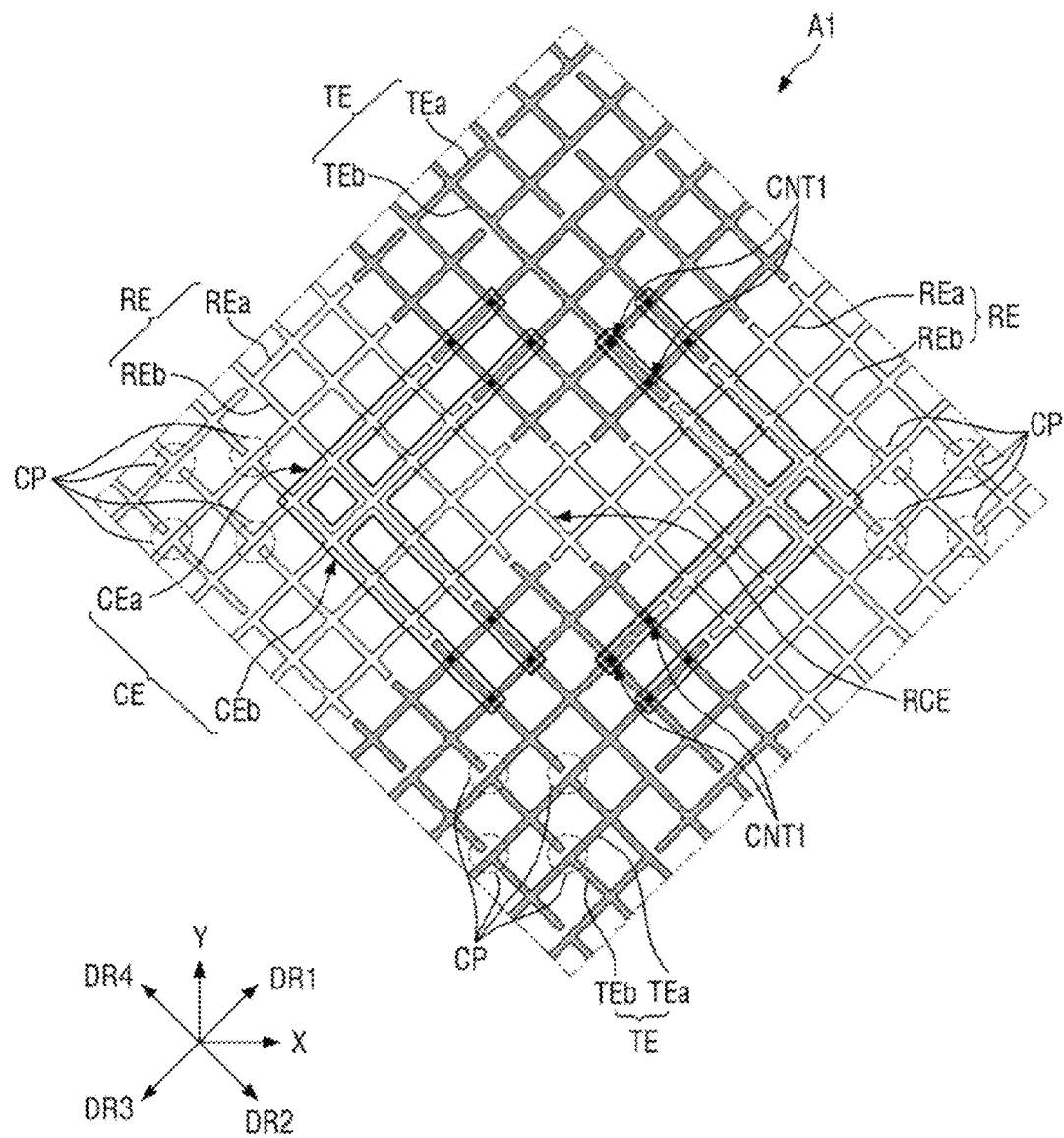
FIG. 10 is an enlarged view illustrating area A1 of FIG. 6 and code patterns according to an embodiment.

FIG. 10 is an enlarged view illustrating area A1 of FIG. 6 and code patterns according to an embodiment. In addition, FIG. 11 is an enlarged view illustrating a portion of area A1 illustrated in FIG. 10.

Figure 11:
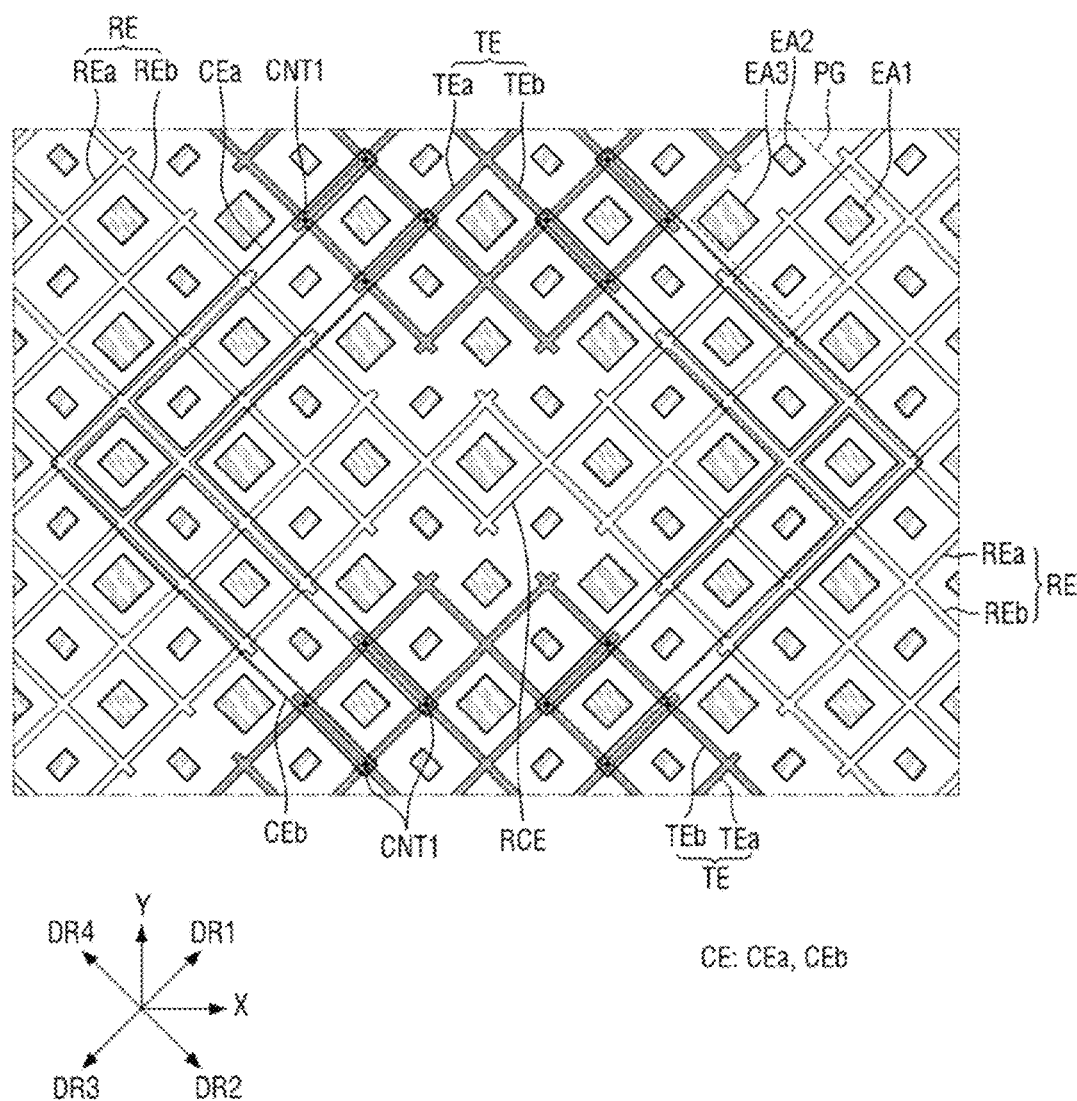
FIG. 11 is an enlarged view illustrating a portion of area A1 illustrated in FIG. 10.

Referring to FIGS. 10 and 11, some of the plurality of touch electrodes SEN may be formed in code pattern shapes. In this case, at least one of the plurality of dummy electrodes DE, the plurality of driving electrodes TE, and the plurality of sensing electrodes RE may be cut in upward, downward, leftward, rightward, and/or diagonal directions along vertical and horizontal reference lines of touch electrodes disposed at preset regular intervals to be formed in preset code shapes. Accordingly, code patterns CP are sensed by the touch input device 20 according to bent or cut directions, cut sizes, cut shapes, and the like.

For example, each of the code patterns CP may correspond to a value of a preset data code. For example, each of the code patterns CP may be provided by cutting one of a plurality of stems extending from an intersection point between at least some of the touch electrodes SEN, but is not necessarily limited thereto. The plurality of stems of at least some of the touch electrodes SEN may extend from the intersection point in the first to fourth directions DR1, DR2, DR3, and DR4, and a stem extending in one of the first to fourth directions DR1, DR2, DR3, and DR4 may be cut. A direction in which the stem is cut may correspond to a value of a preset data code constituting position information.

The code detector 21 of the touch input device 20 senses and detects the code patterns CP included in the display panel 100 in the front surface direction of the display panel 100. For example, the code detector 21 emits infrared light in the front surface direction of the display panel 100, and generates shape data of the code patterns according to forms of infrared light reflected from the code patterns CP of the display panel 100.

In this way, the code detector 21 of the touch input device 20 may continuously detect the code patterns included in partial areas of the touch sensor TSU according to user's control and movement, continuously generate the shape data of the code patterns, and provide the shape data of the code patterns to the code processor 23.

Figure 12:
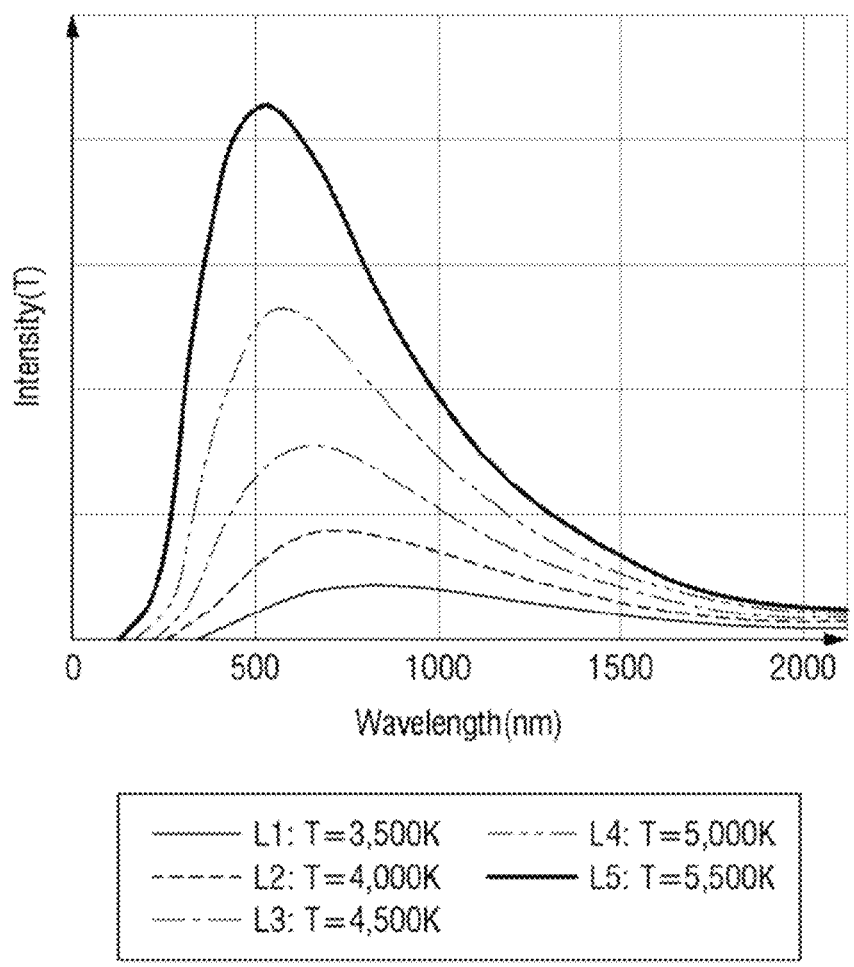
FIG. 12 is a graph illustrating a change in a wavelength of infrared light compared to a change in intensity of external light applied to a display panel.

FIG. 12 is a graph illustrating a change in a wavelength of infrared light compared to a change in intensity of external light applied to a display panel.

Referring to FIG. 12, light characteristic information of a wavelength band of visible light applied in the front surface direction of the display panel 100 may be detected through the illuminance sensor 700 of the display panel 100. Here, it may be confirmed that the wavelength band of the visible light is also changed according to a change in a color temperature characteristic or a brightness characteristic of the visible light. For example, when characteristics such as a color temperature, brightness, and intensity of the visible light applied in the front surface direction of the display panel 100 are changed, characteristics of infrared light may be also changed in proportion to the change in the characteristics of the visible light. As an example, intensity and a wavelength band of infrared light may be changed in proportion to the change in the characteristics such as the color temperature, the brightness, and the intensity in the wavelength band of the visible light.

When characteristics such as a color temperature, brightness, and intensity of external visible light applied in the front surface direction of the display panel 100 increase, intensity and a wavelength band of the infrared light applied to the front surface of the display panel 100 may increase in proportion to the increase in such characteristics. In this case, when the code detector 21 of the touch input device 20 applies the infrared light in the front surface direction of the display panel 100, infrared light saturation may occur on the front surface of the display panel 100. In this case, the code detector 21 of the touch input device 20 might not detect the code patterns CP due to saturated infrared light characteristics.

To prevent the infrared light saturation from occurring on the front surface of the display panel 100, the code processor 23 of the touch input device 20 receives the light characteristic information detected from the illuminance sensor 700 of the display device 10, and adjusts intensity or a wavelength band of the infrared light emitted from the code detector 21. For example, the code processor 23 detects an intensity of light, an amount of light, a color temperature, brightness, luminance, and/or a wavelength band included in the light characteristic information from the light characteristic information input through the communication module 24. In addition, the code processor 23 may modulate the emission control signal so that infrared light emission intensity or wavelength band of the code detector 21 is changed in inverse proportion to a change in the intensity, the amount of light, the color temperature, the brightness, the luminance, and/or the wavelength band. The emission control signal modulated as described above is supplied to the light emitting driver 26. When the infrared light emission intensity or wavelength band of the code detector 21 is changed in inverse proportion to the change in the external light characteristics, a defect occurring in detecting the code patterns CP due to the light saturation or the like may be prevented.

Describing a control process in more detail, the code processor 23 may modulate the emission control signal so that characteristics for the intensity or the waveform band of the infrared light emitted from the light emitter 21(a) of the code detector 21 may be changed. To this end, the code processor 23 may modulate an amplitude and a pulse width of the emission control signal so that the characteristics for the intensity or the waveform band of the infrared light emitted from the light emitter 21(a) may be changed in inverse proportion to the change in intensity, the color temperature, the brightness, the luminance, and/or the wavelength band of the external visible light applied to the display panel 100. When the amplitude and the pulse width of the emission control signal are decreased in inverse proportion to the change in the characteristics of the external visible light, an infrared light emission period, intensity, wavelength band, and the like, of the light emitter 21(a) may be decreased. Conversely, when the amplitude and the pulse width of the emission control signal are increased in inverse proportion to the change in the characteristics of the external visible light, the infrared light emission period, intensity, wavelength band, and the like, of the light emitter 21(a) may be increased. As such, the code processor 23 modulates the emission control signal so that the characteristics for the intensity or the waveform band of the infrared light emitted from the light emitter 21(a) may be changed in inverse proportion to the change in the intensity, the color temperature, the brightness, the luminance, and/or the wavelength band of the external visible light applied to the display panel 100. In addition, the modulated emission control signal may be supplied to the light emitting driver 26.

Figure 13:
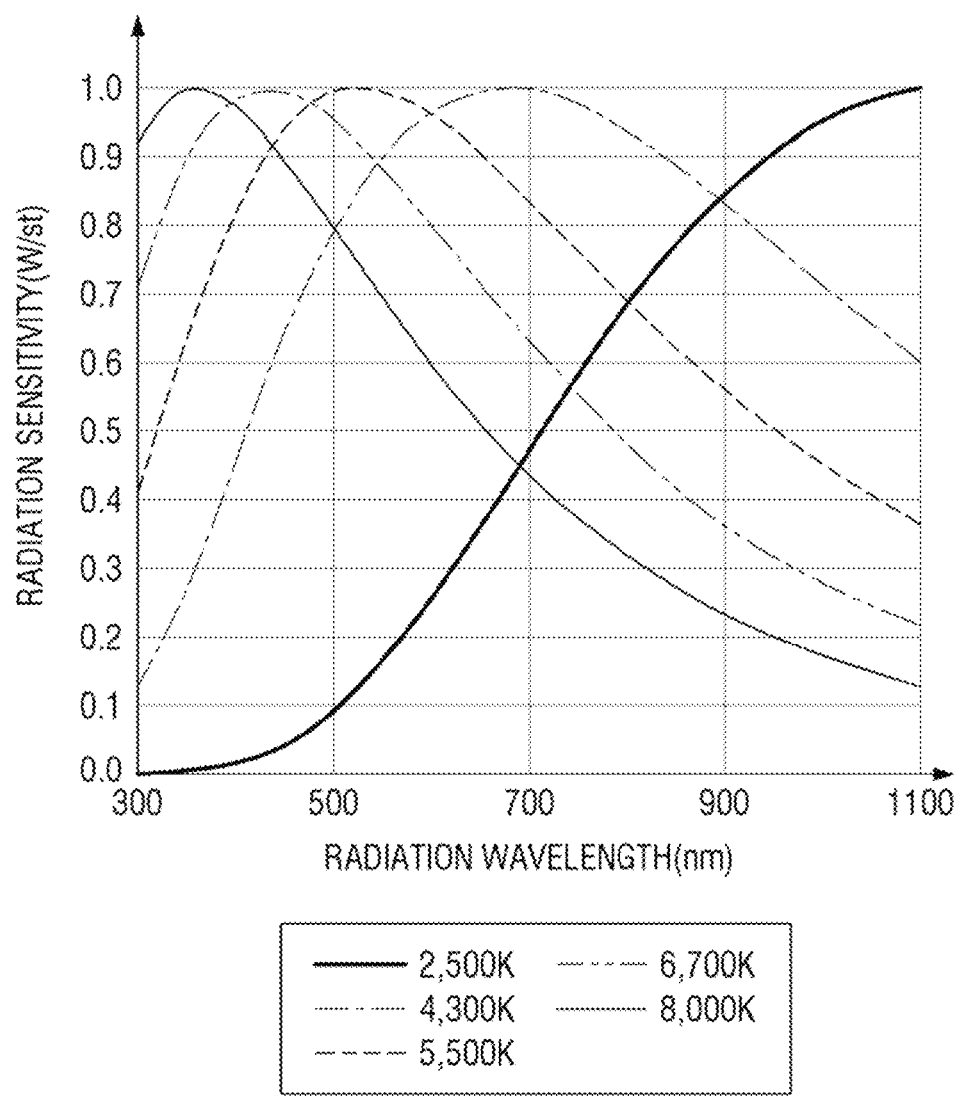
FIG. 13 is a graph illustrating a method of adjusting infrared light emission intensity of the touch input device compared to a change in characteristics of external light applied to the display panel.

FIG. 13 is a graph illustrating a method of adjusting infrared light emission intensity of the touch input device compared to a change in characteristics of external light applied to the display panel.

Referring to FIG. 13, the code processor 23 calculates radiation sensitivity according to color temperature (about 2500K to 8000K) characteristics of the external light detected through the illuminance sensor 700 using a look-up table, and sets the radiation sensitivity as a conversion coefficient. In addition, an infrared light emission intensity (or amount of light) target value of the light emitter 21(a) may be set by substituting the intensity (or the amount of light) of the external visible light detected through the illuminance sensor 700 and the set conversion coefficient into the following Equation 1. Accordingly, the emission control signal may be modulated according to the infrared light emission intensity (or amount of light) target value.

Infrared light emission intensity (or amount of light) of light emitter 21(a)∝1/(intensity (or amount of light) of external visible light×conversion coefficient)     [Equation 1]

Referring to Equation 1, the code processor 23 may grasp characteristics of the external visible light using the conversion coefficient according to the intensity (or the amount of light) and the color temperature of the external visible light, and adjust the infrared light emission intensity of the light emitter 21(a) in inverse proportion to the characteristics of the external visible light. As represented in Equation 1, when the infrared light emission intensity of the light emitter 21(a) is adjusted, an amplitude and a pulse width of the emission control signal may be modulated in inverse proportion to the grasped characteristics of the external visible light, and be supplied to the light emitting driver 26.

Figure 14:
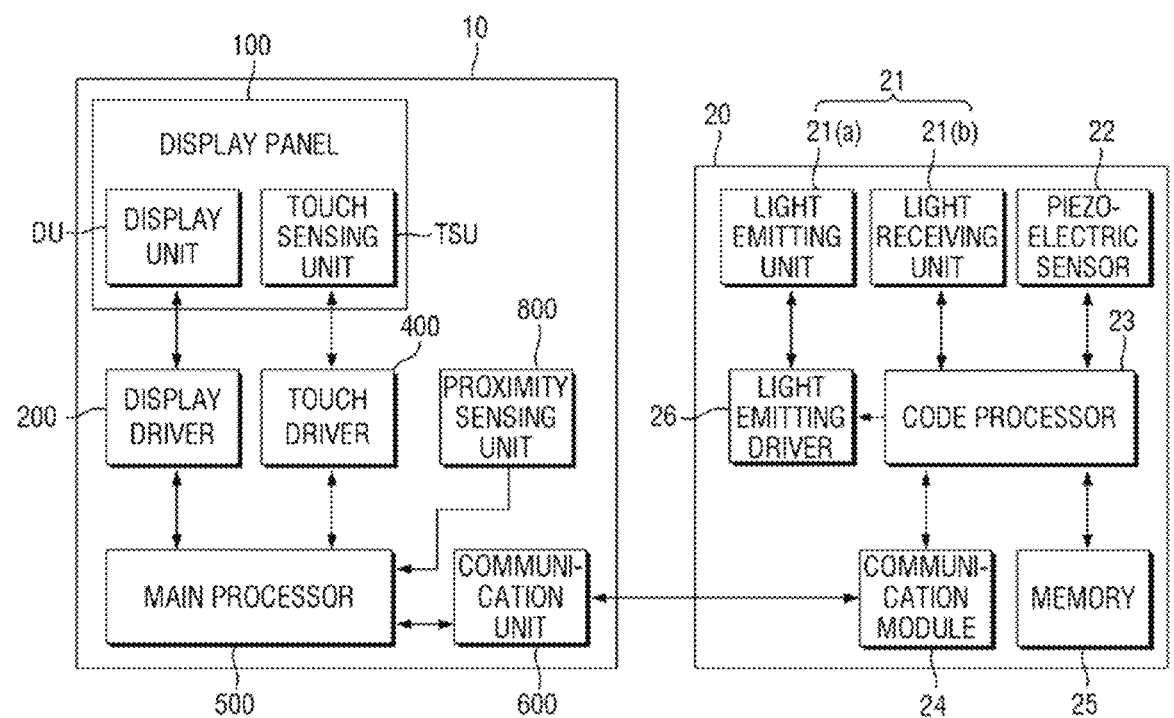
FIG. 14 is a block diagram illustrating the touch input device and the display device of FIG. 1 according to an embodiment.

FIG. 14 is a block diagram illustrating the touch input device and the display device of FIG. 1 according to an embodiment.

Referring to FIG. 14, the display device 10 may include a display panel 100, a display driver 200, a touch driver 400, a proximity sensor 800, a main processor 500, and a communicator 600.

The display panel 100 of the display device 10 may include a display DU displaying an image through a plurality of pixels and a touch sensor TSU sensing a human body part such as a finger, the touch input device 20, and the like. Code patterns may be formed on some of touch electrodes of the touch sensor TSU, and may be sensed by the touch input device 20. Some of the touch electrodes may be formed in code pattern shapes and be sensed as the code patterns by the touch input device 20.

The proximity sensor 800 may be embedded in the display device 10 or the display panel 100, and may be disposed on a front surface or at least one side surface of the display panel 100.

The proximity sensor 800 may include at least one infrared light emitting sensor and at least one infrared light receiving sensor. Accordingly, at least one infrared light emitting sensor emits infrared light toward the front surface or at least one side surface of the display panel 100, and at least one infrared light receiving sensor receives infrared light reflected from the front surface or at least one side surface of the display panel 100.

The proximity sensor 800 detects a characteristic of the infrared light reflected from the front surface or at least one side surface of the display panel 100 (e.g., intensity and/or a wavelength band of the received infrared light) through at least one infrared light receiving sensor.

The proximity sensor 800 transmits infrared light characteristic information detected in real time to the main processor 500, and the main processor 500 shares the infrared light characteristic information input from the proximity sensor 800 with the touch input device 20 through the communicator 600.

As the intensity and the wavelength band of the infrared light detected through the proximity sensor 800 decrease, it may be determined that there is no object or body part approaching the front surface or at least one side surface of the display panel 100. As the intensity and the wavelength band of the infrared light detected through the proximity sensor 800 increase, it may be determined that specific object or body part approaches the front surface or at least one side surface of the display panel 100.

The main processor 500 may modulate a mode switching signal so that an image display mode displayed on the display panel 100 is switched according to the infrared light characteristic information input from the proximity sensor 800 and supply the modulated mode switching signal to the display driver 200. As an example, when the intensity and/or the wavelength band of the infrared light input from the proximity sensor 800 becomes greater or higher than preset reference intensity or reference wavelength band of the infrared light, the main processor 500 may modulate a mode switching signal so that a mode of the display panel 100 is switched to a power saving mode, and supply the modulated mode switching signal to the display driver 200. Conversely, when the intensity and/or the wavelength band of the infrared light input from the proximity sensor 800 becomes greater or higher than preset reference intensity or reference wavelength band of the infrared light, the main processor 500 may modulate a mode switching signal so that a mode of the display panel 100 is switched to an image display mode, and supply the modulated mode switching signal to the display driver 200.

The touch input device 20 may include a code detector 21, a light emitting driver 26, a piezoelectric sensor 22, a code processor 23, a communication module 24, and a memory 25.

When the infrared light characteristic information is received from the communicator 600, the communication module 24 of the touch input device 20 selectively supplies the infrared light characteristic information to the code processor 23. Accordingly, external light characteristic information might not be transmitted.

The code processor 23 of the touch input device 20 receives infrared light characteristic information data according to infrared light characteristic detection information of the display panel 100 through the communication module 24. The code processor 23 generates and modulates an emission control signal so that an intensity or wavelength band characteristic of infrared light emitted from the light emitter 21(*a*) is changed according to a change in the infrared light characteristic information of the display panel 100 input through the communication module 24. As an example, the code processor 23 may modulate an amplitude and a pulse width of the emission control signal so that the intensity or wavelength band characteristic of the infrared light of the light emitter 21(*a*) is changed in proportion to a change in the intensity or the wavelength band of the infrared light of the display panel 100 input through the communication module 24, and supply the emission control signal of which the amplitude and the pulse width are modulated to the light emitting driver 26.

As a wavelength band or intensity of near infrared light of the display panel 100 increases, the code processor 23 may determine that an object or a human body part approaches the display panel 100, such that a front surface portion of the display panel 100 becomes dark. Accordingly, when the intensity or the wavelength band of the infrared light emitted from the light emitter 21(*a*) of the touch input device 20 is low, a code pattern recognition rate of the light receiving unit 21(*b*) may decrease. Accordingly, the code processor 23 may modulate the emission control signal so that the intensity or wavelength band characteristic of the infrared light emitted from the light emitter 21(*a*) increases as the intensity or wavelength band characteristic of the near infrared light of the display panel 100 increases, and supply the modulated emission control signal to the light emitting driver 26. Conversely, when the intensity or the wavelength band of the near infrared light of the display panel 100 decreases, the code processor 23 may determine that there is no object or human body in the vicinity of the display panel 100, such that the vicinity of the display panel becomes bright.

Accordingly, when the intensity or the wavelength band of the near infrared light of the display panel 100 decreases, the code processor 23 may modulate the emission control signal so that the intensity or the wavelength band of the infrared light emitted from the light emitter 21(*a*) decrease to prevent a defect such as light saturation.

Figure 15:
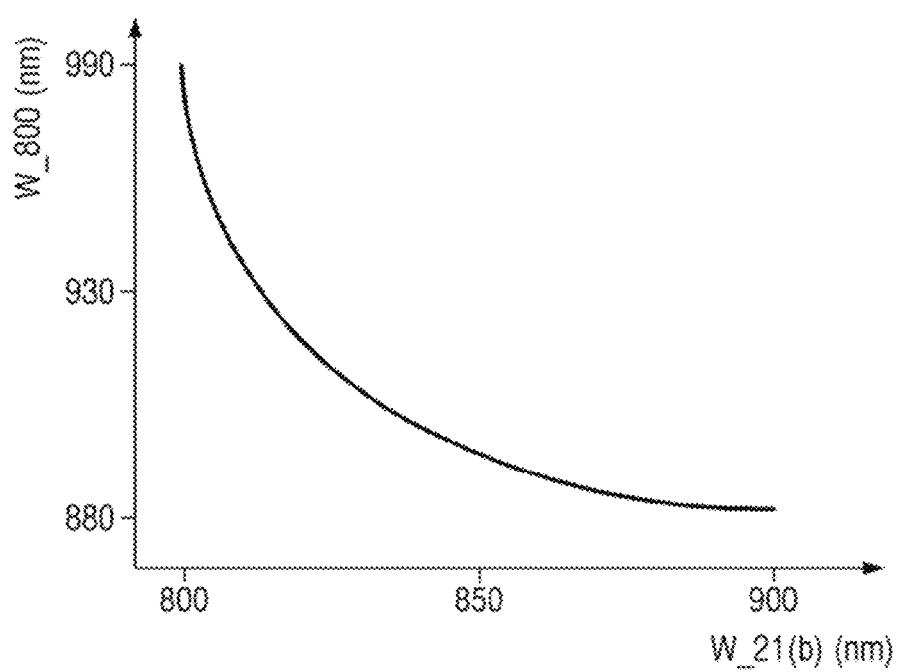
FIG. 15 is a graph illustrating a method of adjusting a wavelength of infrared light of the touch input device compared to a change in a wavelength of infrared light sensed by a proximity sensor of the display panel.

FIG. 15 is a graph illustrating a method of adjusting a wavelength of infrared light of the touch input device compared to a change in a wavelength of infrared light sensed by a proximity sensor of the display panel.

The code processor 23 may generate and modulate the emission control signal so that the characteristics for the intensity or the waveform band of the infrared light emitted from the light emitter 21(*a*) may be changed according to the change in the intensity and/or the wavelength band of the near infrared light of the display panel 100. In addition, the modulated emission control signal may be supplied to the light emitting driver 26 of the light emitter 21(*a*).

For example, the code processor 23 may generate and modulate the emission control signal so that the characteristics for the intensity or the waveform band of the infrared light emitted from the light emitter 21(*a*) may be changed in proportion to the change in the intensity and/or the wavelength band of the near infrared light of the display panel 100. The code processor 23 may generate and modulate the emission control signal so that the characteristics for the intensity or the waveform band of the infrared light emitted from the light emitter 21(*a*) may be changed in inverse proportion to the change in the intensity and/or the wavelength band of the near infrared light of the display panel 100. In addition, the modulated emission control signal may be supplied to the light emitting driver 26 of the light emitter 21(*a*).

Figure 16:
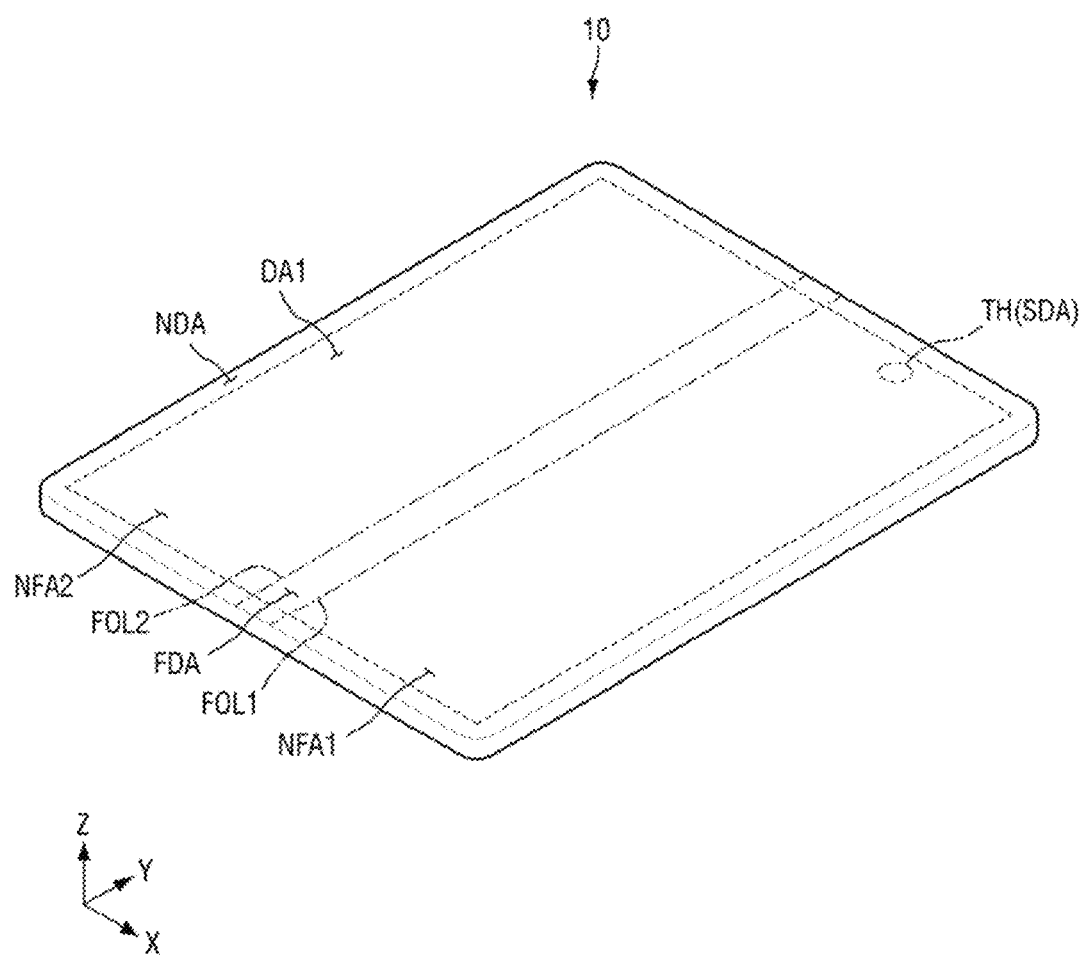
FIGS. 16 and 17 are perspective views illustrating a display device according to an embodiment of the present disclosure.
Figure 17:
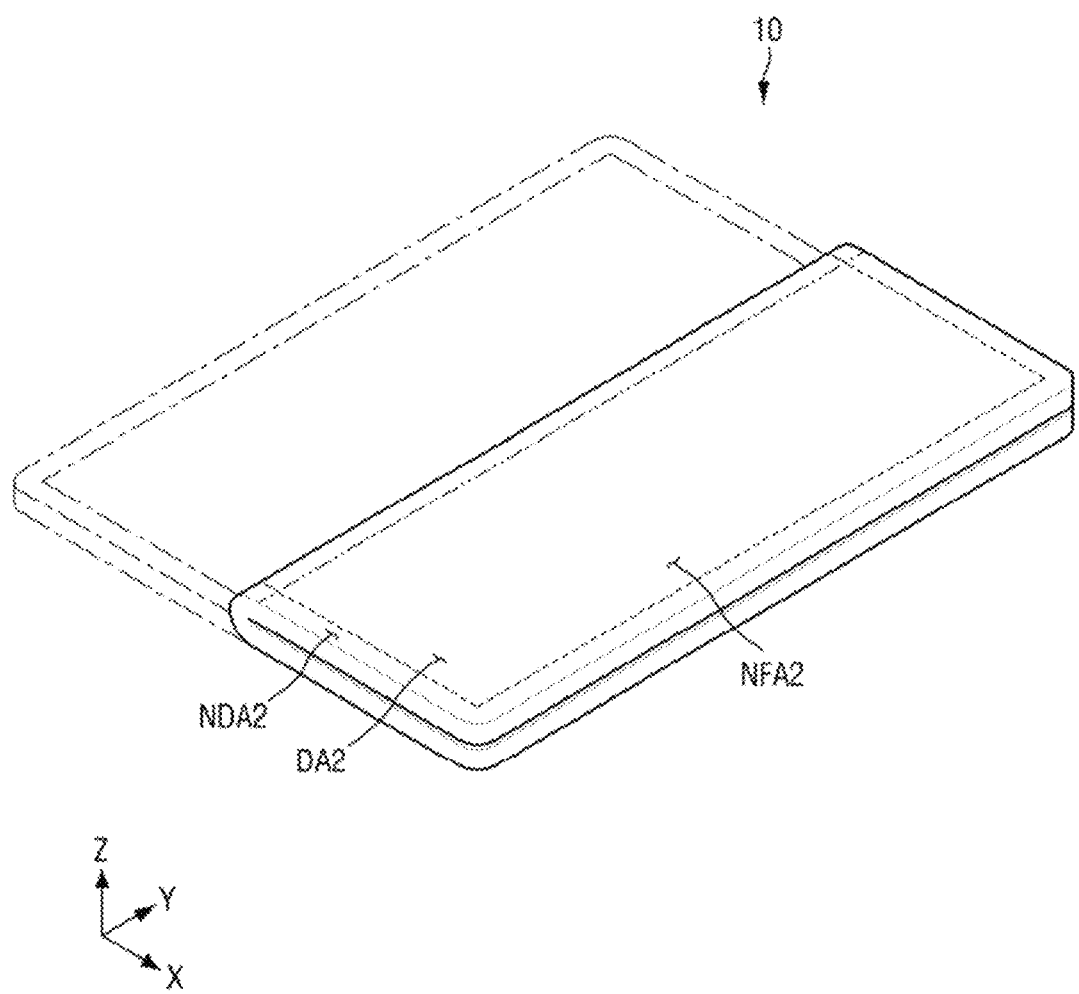

FIGS. 16 and 17 are perspective views illustrating a display device according to an embodiment of the present disclosure.

It is illustrated in FIGS. 16 and 17 that a display device 10 is a foldable display device folded in a first direction (X-axis direction). The display device 10 may be maintained in both a folded state and an unfolded state. The display device 10 may be folded in an in-folding manner in which a front surface thereof is disposed inside the fold. When the display device 10 is bent or folded in the in-folding manner, front surfaces of the display device 10 may face each other. Alternatively, the display device 10 may be folded in an out-folding manner in which a front surface faces outwardly so as to remain viewable when in the folded state. When the display device 10 is bent or folded in the out-folding manner, rear surfaces of the display device 10 may face each other and the front surface may be hidden and protected.

A first non-folding area NFA1 may be disposed on one side, for example, the right side of a folding area FDA. A second non-folding area NFA2 may be disposed on the other side, for example, on the left side of the folding area FDA. The touch sensors TSU, according to an embodiment of the present disclosure, may be formed and disposed on the first non-folding area NFA1 and the second non-folding area NFA2, respectively.

A first folding line FOL1 and a second folding line FOL2 may extend in a second direction (Y-axis direction), and the display device 10 may be folded in the first direction (X-axis direction). Accordingly, a length of the display device 10 in the first direction (X-axis direction) may be reduced by approximately half, and thus, a user may conveniently carry the display device 10.

Meanwhile, an extension direction of the first folding line FOL1 and an extension direction of the second folding line FOL2 are not necessarily limited to the second direction (Y-axis direction). For example, the first folding line FOL1 and the second folding line FOL2 may extend in the first direction (X-axis direction), and the display device 10 may be folded in the second direction (Y-axis direction). In this case, a length of the display device 10 in the second direction (Y-axis direction) may be reduced by approximately half. Alternatively, the first folding line FOL1 and the second folding line FOL2 may extend in a diagonal direction of the display device 10 corresponding to a direction between the first direction (X-axis direction) and the second direction (Y-axis direction). In this case, the display device 10 may be folded in a triangular shape.

When the first folding line FOL1 and the second folding line FOL2 extend in the second direction (Y-axis direction), a length of the folding area FDA in the first direction (X-axis direction) may be shorter than a length of the folding area FDA in the second direction (Y-axis direction). In addition, a length of the first non-folding area NFA1 in the first direction (X-axis direction) may be greater than the length of the folding area FDA in the first direction (X-axis direction). A length of the second non-folding area NFA2 in the first direction (X-axis direction) may be greater than a length of the folding area FDA in the first direction (X-axis direction).

A first display area DA1 may be disposed on a front surface of the display device 10. The first display area DA1 may overlap the folding area FDA, the first non-folding area NFA1, and the second non-folding area NFA2. Therefore, when the display device 10 is unfolded, an image may be displayed in a front surface direction in the folding area FDA, the first non-folding area NFA1, and the second non-folding area NFA2 of the display device 10.

A second display area DA2 may be disposed on a rear surface of the display device 10. The second display area DA2 may overlap the second non-folding area NFA2. Therefore, when the display device 10 is folded, an image may be displayed in a front surface direction in the second non-folding area NFA2 of the display device 10.

It is illustrated in FIGS. 16 and 17 that a through hole TH in which a camera SDA or the like is formed is disposed in the first non-folding area NFA1, but the present disclosure is not necessarily limited thereto. The through hole TH or the camera SDA may be disposed in the second non-folding area NFA2 or the folding area FDA.

Figure 18:
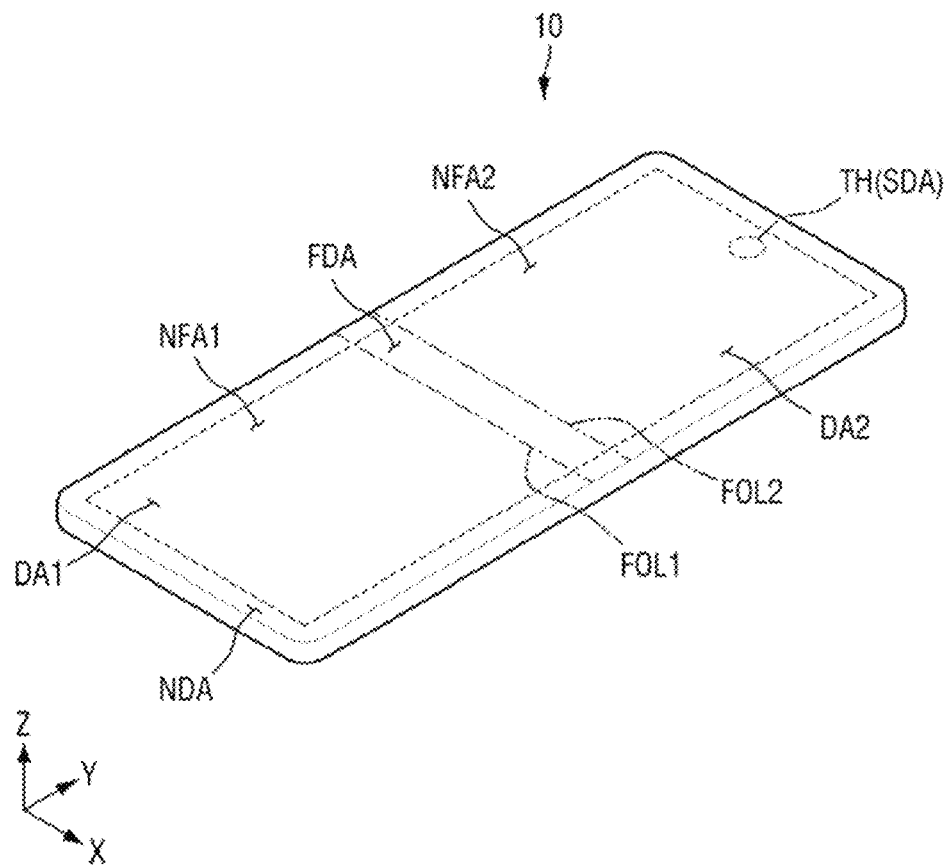
FIGS. 18 and 19 are perspective views illustrating a display device according to an embodiment of the present disclosure.
Figure 19:
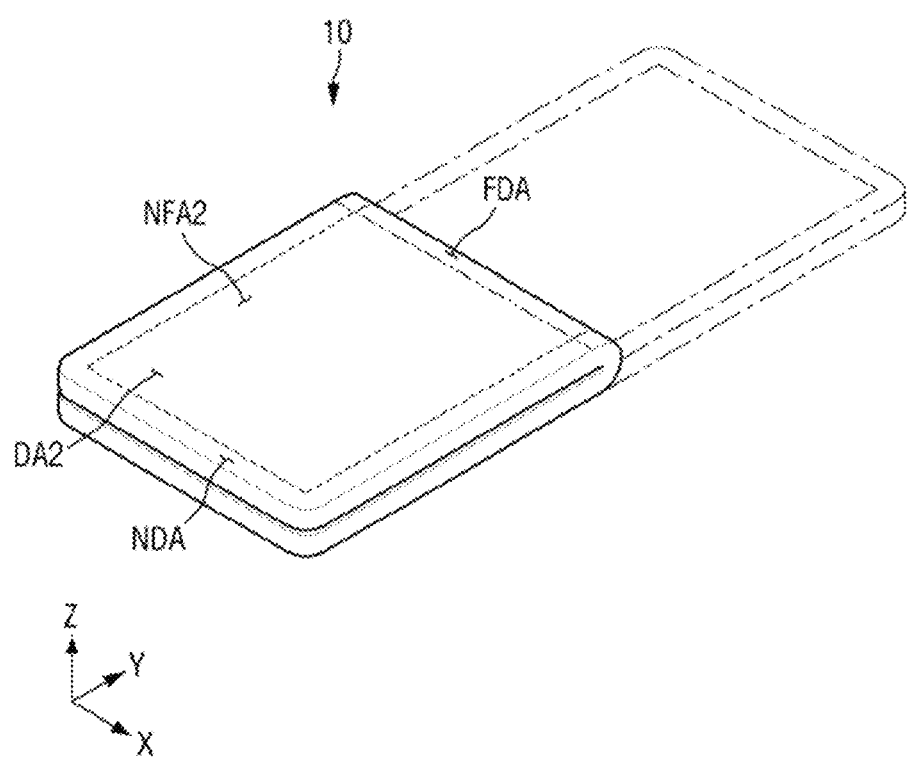

FIGS. 18 and 19 are perspective views illustrating a display device according to an embodiment of the present disclosure.

It is illustrated in FIGS. 18 and 19 that a display device 10 is a foldable display device folded in the second direction (Y-axis direction). The display device 10 may be maintained in both a folded state and an unfolded state. The display device 10 may be folded in an in-folding manner in which a front surface thereof is disposed within the fold. When the display device 10 is bent or folded in the in-folding manner, front surfaces of the display device 10 may face each other and may thus be hidden and protected. Alternatively, the display device 10 may be folded in an out-folding manner in which a front surface faces outwardly and remains viewable while in the folded state. When the display device 10 is bent or folded in the out-folding manner, rear surfaces of the display device 10 may face each other.

The display device 10 may include a folding area FDA, a first non-folding area NFA1, and a second non-folding area NFA2. The folding area FDA may be an area in which the display device 10 is folded, and the first non-folding area NFA1 and the second non-folding area NFA2 may be areas in which the display device 10 is not folded. The first non-folding area NFA1 may be disposed on one side, for example, the lower side of the folding area FDA. The second non-folding area NFA2 may be disposed on the other side, for example, on the upper side of the folding area FDA.

The touch sensors TSU according to an embodiment of the present disclosure may be formed and disposed on the first non-folding area NFA1 and the second non-folding area NFA2, respectively.

The folding area FDA may be an area bent with a predetermined curvature in a first folding line FOL1 and a second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

The first folding line FOL1 and the second folding line FOL2 may extend in the first direction (X-axis direction) as illustrated in FIGS. 18 and 19, and the display device 10 may be folded in the second direction (Y-axis direction). Accordingly, a length of the display device 10 in the second direction (Y-axis direction) may be reduced by approximately half, and thus, a user may conveniently carry the display device 10.

Meanwhile, an extension direction of the first folding line FOL1 and an extension direction of the second folding line FOL2 are not necessarily limited to the first direction (X-axis direction). For example, the first folding line FOL1 and the second folding line FOL2 may extend in the second direction (Y-axis direction), and the display device 10 may be folded in the first direction (X-axis direction). In this case, a length of the display device 10 in the first direction (X-axis direction) may be reduced by approximately half. Alternatively, the first folding line FOL1 and the second folding line FOL2 may extend in a diagonal direction of the display device 10 corresponding to a direction between the first direction (X-axis direction) and the second direction (Y-axis direction). In this case, the display device 10 may be folded in a triangular shape.

When the first folding line FOL1 and the second folding line FOL2 extend in the first direction (X-axis direction) as illustrated in FIGS. 18 and 19, a length of the folding area FDA in the second direction (Y-axis direction) may be shorter than a length of the folding area FDA in the first direction (X-axis direction). In addition, a length of the first non-folding area NFA1 in the second direction (Y-axis direction) may be greater than the length of the folding area FDA in the second direction (Y-axis direction). A length of the second non-folding area NFA2 in the second direction (Y-axis direction) may be greater than the length of the folding area FDA in the second direction (Y-axis direction).

A first display area DA1 may be disposed on a front surface of the display device 10. The first display area DA1 may overlap the folding area FDA, the first non-folding area NFA1, and the second non-folding area NFA2. Therefore, when the display device 10 is unfolded, an image may be displayed in a front surface direction in the folding area FDA, the first non-folding area NFA1, and the second non-folding area NFA2 of the display device 10.

A second display area DA2 may be disposed on a rear surface of the display device 10. The second display area DA2 may overlap the second non-folding area NFA2. Therefore, when the display device 10 is folded, an image may be displayed in a front surface direction in the second non-folding area NFA2 of the display device 10.

It is illustrated in FIGS. 18 and 19 that a through hole TH in which a camera SDA or the like is disposed is disposed in the second non-folding area NFA2, but the present disclosure is not necessarily limited thereto. The through hole TH may be disposed in the first non-folding area NFA1 or the folding area FDA.

In concluding the detailed description, those skilled in the art will appreciate that many variations and modifications can be made to the preferred embodiments without substantially departing from the principles of the present disclosure.

What is claimed is:

1. A touch input device, comprising:
   a communication module receiving external light characteristic information;
   a code detector emitting infrared light and receiving infrared light reflected from a display panel that is not connected to the touch input device to detect code patterns of the display panel;
   a light emitting driver controlling an infrared light emission operation of the code detector; and
   a code processor modulating an emission control signal to change an infrared light emission characteristic of the code detector according to a change in the external light characteristic information and to control the light emitting driver,
   wherein the code processor modulates the emission control signal proportionally with respect to the change in the external light characteristic information so as to cause the light emitting driver to increase the amplitude of the infrared light when the external light characteristic information shows an increase in external light.

2. A touch input device, comprising:
   a communication module receiving external light characteristic information;
   a code detector emitting infrared light and receiving infrared light reflected from a display panel to detect code patterns of the display panel;
   a light emitting driver controlling an infrared light emission operation of the code detector; and
   a code processor modulating an emission control signal to change an infrared light emission characteristic of the code detector according to a change in the external light characteristic information and to control the light emitting driver,
   wherein the code processor
   detects an intensity of light, an amount of light, a color temperature, brightness, luminance, and/or a wavelength band from the external light characteristic information, and
   modulates an amplitude and a pulse width of the emission control signal so that an infrared light emission intensity or wavelength band characteristic of the code detector is changed according to a change in the intensity of light, the amount of light, the color temperature, the brightness, the luminance, and/or the wavelength band.

3. The touch input device of claim 2, wherein the code processor modulates the emission control signal so that the infrared light emission intensity or wavelength band of the code detector is changed in inverse proportion to a change in the intensity of light, the amount of light, the color temperature, the brightness, the luminance, and/or the wavelength band among the external light characteristic information, and supplies the modulated emission control signal to the light emitting driver.

4. The touch input device of claim 2, wherein the code processor modulates an amplitude and a pulse width of the emission control signal so that the infrared light emission intensity or wavelength band of the code detector is changed in proportion to a change the intensity of light, the amount of light, the color temperature, the brightness, the luminance, and/or the wavelength band among the external light characteristic information.

5. The touch input device of claim 2, wherein the code processor
   calculates radiation sensitivity according to a color temperature characteristic among the external light characteristic information using a look-up table and sets the radiation sensitivity as a conversion coefficient,
   sets an infrared light emission intensity or amount of light target value of the code detector by substituting the intensity or the amount of light among the external light characteristic information and the set conversion coefficient into Equation 1: Infrared light emission intensity (or amount of light)∝1/(intensity (or amount of light) of external visible light×conversion coefficient), and
   modulates the emission control signal according to the infrared light emission intensity or amount of light target value.

6. The touch input device of claim 2, wherein the communication module selectively supplies infrared light characteristic information to the code processor when the infrared light characteristic information is received from an external source.

7. The touch input device of claim 6, wherein the code processor modulates an amplitude and a pulse width of the emission control signal so that the infrared light emission intensity or wavelength band characteristic of the code detector is changed in proportion to a change in intensity or a wavelength band of infrared light among the infrared light characteristic information, and supplies the emission control signal of which the amplitude and the pulse width are modulated to the light emitting driver.

8. The touch input device of claim 6, wherein the code processor modulates an amplitude and a pulse width of the emission control signal so that the infrared light emission intensity or wavelength band characteristic of the code detector is changed in inverse proportion to a change in intensity or a wavelength band of infrared light among the infrared light characteristic information, and supplies the emission control signal of which the amplitude and the pulse width are modulated to the light emitting driver.

9. A display device, comprising:
   a display panel in which code patterns are formed;
   an illuminance sensor detecting external light characteristic information of the display panel;
   a main processor controlling image display driving of the display panel; and
   a touch input device receiving infrared light reflected from the display panel to detect shape data for the code patterns, generating coordinate data according to the shape data, and transferring the generated coordinate data to the main processor.

10. The display device of claim 9, wherein the main processor modulates digital video data so that luminance or brightness of an image displayed on the display panel is changed in proportion to a change in a detection value of an intensity of light, an amount of light, a color temperature, luminance, and/or brightness among the external light characteristic information input from the illuminance sensor.

11. The display device of claim 9, wherein the code patterns are formed in shapes of at least one electrode of a plurality of driving electrodes, a plurality of sensing electrodes, and a plurality of dummy electrodes included in a touch sensor of the display panel, or
   the code patterns are formed by light blockers on partial areas of front surfaces of at least one electrode of the plurality of driving electrodes, the plurality of sensing electrodes, and the plurality of dummy electrodes.

12. The display device of claim 11, further comprising a proximity sensor emitting infrared light toward a front surface or at least one side surface of the display panel and detecting infrared light characteristic information on infrared light reflected from the front surface or the at least one side surface of the display panel.

13. The display device of claim 12, wherein the touch input device includes:
   a communication module receiving the external light characteristic information;
   a code detector emitting infrared light and receiving the infrared light reflected from the display panel to detect the code patterns;
   a light emitting driver controlling an infrared light emission operation of the code detector; and
   a code processor modulating an emission control signal so that an infrared light emission characteristic of the code detector is changed according to a change in the external light characteristic information and controlling driving of the light emitting driver.

14. The display device of claim 13, wherein the code processor detects an intensity of light, an amount of light, a color temperature, brightness, luminance, and/or a wavelength band from the external light characteristic information, and modulates an amplitude and a pulse width of the emission control signal so that an infrared light emission intensity or wavelength band characteristic of the code detector is changed according to a change in the intensity of light, the amount of light, the color temperature, the brightness, the luminance, and/or the wavelength band.

15. The display device of claim 14, wherein the code processor modulates the emission control signal so that the infrared light emission intensity or wavelength band of the code detector is changed in inverse proportion to a change in the intensity of light, the amount of light, the color temperature, the brightness, the luminance, and/or the wavelength band among the external light characteristic information, and supplies the modulated emission control signal to the light emitting driver.

16. The display device of claim 13, wherein the code processor modulates an amplitude and a pulse width of the emission control signal so that the infrared light emission intensity or wavelength band of the code detector is changed in proportion to a change in the intensity of light, the amount of light, the color temperature, the brightness, the luminance, and/or the wavelength band among the external light characteristic information.

17. The display device of claim 16, wherein the code processor
calculates radiation sensitivity according to a color temperature characteristic among the external light characteristic information using a look-up table and sets the radiation sensitivity as a conversion coefficient,
sets an infrared light emission intensity or amount of light target value of the code detector by substituting the intensity or the amount of light among the external light characteristic information and the set conversion coefficient into Equation 1: Infrared light emission intensity (or amount of light) of light emitter $\propto 1/$(intensity (or amount of light) of external visible light$\times$conversion coefficient), and
modulates the emission control signal according to the infrared light emission intensity or amount of light target value.

18. The display device of claim 13, wherein the communication module selectively supplies infrared light characteristic information to the code processor when the infrared light characteristic information is received.

19. The display device of claim 18, wherein the code processor modulates an amplitude and a pulse width of the emission control signal so that the infrared light emission intensity or wavelength band characteristic of the code detector is changed in proportion to a change in intensity or a wavelength band of infrared light among the infrared light characteristic information, and supplies the emission control signal of which the amplitude and the pulse width are modulated to the light emitting driver.

20. The display device of claim 18, wherein the code processor modulates an amplitude and a pulse width of the emission control signal so that the infrared light emission intensity or wavelength band characteristic of the code detector is changed in inverse proportion to a change in intensity or a wavelength band of infrared light among the infrared light characteristic information, and supplies the emission control signal of which the amplitude and the pulse width are modulated to the light emitting driver.

21. An electronic device including a display device, wherein the display device comprising:
   a display panel in which code patterns are formed;
   an illuminance sensor detecting external light characteristic information of the display panel;
   a main processor controlling image display driving of the display panel; and
   a touch input device receiving infrared light reflected from the display panel to detect shape data for the code patterns, generating coordinate data according to the shape data, and transferring the generated coordinate data to the main processor.

* * * * *